US008412103B2

(12) United States Patent
Srinivasan et al.

(10) Patent No.: US 8,412,103 B2
(45) Date of Patent: Apr. 2, 2013

(54) METHODS AND APPARATUS FOR GENERATING, REPORTING AND USING INTERFERENCE CANCELLATION INFORMATION

(75) Inventors: Murari Srinivasan, Santa Clara, CA (US); Amit Butala, Sunnyvale, CA (US); Sayandev Mukherjee, Santa Clara, CA (US)

(73) Assignee: SpiderCloud Wireless, Inc., San Jose, CA (US)

( * ) Notice: Subject to any disclaimer, the term of this patent is extended or adjusted under 35 U.S.C. 154(b) by 529 days.

(21) Appl. No.: 12/571,216

(22) Filed: Sep. 30, 2009

(65) Prior Publication Data
US 2010/0087221 A1    Apr. 8, 2010

Related U.S. Application Data

(60) Provisional application No. 61/101,615, filed on Sep. 30, 2008, provisional application No. 61/101,630, filed on Sep. 30, 2008, provisional application No. 61/101,659, filed on Sep. 30, 2008, provisional application No. 61/101,652, filed on Sep. 30, 2008.

(51) Int. Cl.
*H04B 1/00* (2006.01)
(52) U.S. Cl. .............. 455/63.1; 455/453; 455/452.2; 455/442; 455/67.11; 455/67.13; 455/114.2; 455/522; 370/330; 370/335; 370/337; 370/342; 375/148; 375/346
(58) Field of Classification Search .......... 455/63.1, 455/453, 452.2, 442, 67.11, 67.13, 114.2, 455/522; 370/347, 330, 346, 329; 375/148, 375/346
See application file for complete search history.

(56) References Cited

U.S. PATENT DOCUMENTS

| | | | | |
|---|---|---|---|---|
| 7,139,274 | B2 * | 11/2006 | Attar et al. | 370/395.4 |
| 7,162,250 | B2 * | 1/2007 | Misra | 455/453 |
| 7,190,749 | B2 * | 3/2007 | Levin et al. | 375/346 |
| 7,746,816 | B2 * | 6/2010 | Attar et al. | 370/318 |
| 7,805,153 | B2 * | 9/2010 | Hamabe | 455/522 |

(Continued)

FOREIGN PATENT DOCUMENTS

| | | |
|---|---|---|
| JP | 03-022631 | 1/1991 |
| JP | 03-022632 | 1/1991 |

(Continued)

OTHER PUBLICATIONS

International Search Report for PCT Application No. PCT/US2009/059140 dated Jan. 29, 2010.

(Continued)

*Primary Examiner* — Marceau Milford
(74) *Attorney, Agent, or Firm* — AlbertDhand LLP

(57) ABSTRACT

Apparatus and methods for power control for mitigation or control of interference in a wireless communications environment. Power control techniques can consider the effectiveness of interference cancellation before making power control determinations. For example, where interference with a base station from an interfering wireless terminal is being canceled such that the effects of that interference are not adversely affecting operations of the base station, the offending terminal can be left unchanged, or its transmit power can be increased. On the other hand, where the interference cancellation operation is not able to cancel the effects of the interfering signal sufficiently, the operation can lower the uplink transmit power of the offending signal so as to not cause interference to the other base station.

64 Claims, 23 Drawing Sheets

U.S. PATENT DOCUMENTS

| | | | |
|---|---|---|---|
| 7,991,403 B2 * | 8/2011 | Lee et al. | 455/453 |
| 8,000,716 B2 * | 8/2011 | Tsao et al. | 455/453 |
| 8,014,781 B2 * | 9/2011 | Ji et al. | 455/449 |
| 8,150,412 B2 * | 4/2012 | Cheng et al. | 455/453 |
| 8,200,270 B2 * | 6/2012 | Ariyur | 455/522 |
| 2004/0229621 A1 | 11/2004 | Misra | |
| 2007/0004423 A1 | 1/2007 | Gerlach et al. | |
| 2007/0040704 A1 * | 2/2007 | Smee et al. | 340/981 |
| 2007/0093261 A1 * | 4/2007 | Hou et al. | 455/506 |
| 2009/0135790 A1 * | 5/2009 | Yavuz et al. | 370/336 |
| 2009/0137241 A1 * | 5/2009 | Yavuz et al. | 455/423 |
| 2009/0252099 A1 * | 10/2009 | Black et al. | 370/329 |

FOREIGN PATENT DOCUMENTS

| | | |
|---|---|---|
| WO | WO-2007/149616 | 12/2007 |

OTHER PUBLICATIONS

Qualcomm Europe: "Utran Enhancements for the support of inter-cell interference cancellation." 3GPP Draft; R3-080069 Utran Enhancements for the Support of Inter-cell Interference Cancellation, 3rd Generation Partnership Project (3GPP), Mobile competence Centre; 650, Route Des Lucioles; F-06921 Sophia-Antipoles Cedex; France, vol. RAN WG3, No. Sorrento, Italy; Feb. 11-15, 2008.

International Search Report for PCT Application No. PCT/US2009/059140 dated Apr. 14, 2011.

US Office Action dated Sep. 15, 2011 for U.S. Appl. No. 12/571,211.

International Search Report for PCT Application No. PCT/US2009/059138 dated Mar. 3, 2010.

* cited by examiner

METHODS AND APPARATUS FOR GENERATING, REPORTING AND USING INTERFERENCE CANCELLATION INFORMATION

CROSS-REFERENCE TO RELATED APPLICATIONS

This application claims priority from Provisional Application(s) Ser. Nos. 61/101,615, 61/101,630, 61/101,659, and 61/101,652, all of which were filed on Sep. 30, 2008 and each of which is hereby incorporated herein by reference in their entirety.

TECHNICAL FIELD

The present invention relates generally to wireless communications, and more particularly, some embodiments relate to methods and apparatus to mitigate interference or the effects thereof in a wireless communication system.

DESCRIPTION OF THE RELATED ART

Perhaps the genesis of mobile telephones can be traced back to their predecessors: two-way radios that were regularly used in taxicabs, police cruisers, and other like vehicles. These early radios were of limited use and flexiblity, and typically only provided half-duplex communications. More flexibility was introduced with the transportable telephones, also known as bag phones, which were used as mobile two-way radios, but could also be patched into the telephone network and used as portable phones.

The development of modern cellular technology is credited, in part to Bell Labs, whose engineers and scientists were responsible for such innovations as hexagonal cell transmissions for mobile phones and early developments in cellular telephony. However, Bell Labs was not alone. In 1973, Marty Cooper, the lead engineer of the team at Motorola that developed the handheld mobile phone, made what is believed to be the first public cellular telephone call. The call was placed to Dr. Joel S. Engel, head of research at AT&T's Bell Labs. This early work led to a paradigm shift from two-way radios and car phones to more personal, flexible and portable telephones, now known as mobile or cellular telephones.

Modern cellular communications utilize a series of base stations that relay communications from cellular telephones to other cellular phones and to the Public Switched Telephone Network (PSTN). The antenna towers for the base stations are geographically distributed in a manner so as to provide overlapping cell coverage to the subscriber mobile devices. As mobile devices move through coverage areas they are handed off from one base station to the next to provide mobile coverage.

In wireless communication systems, including cellular and other wireless systems, a factor that can affect system performance is interference among multiple transmitters operating within the system. Interference among devices within a given system (such as interference among multiple cellular handsets, for example) is referred to as "self-interference." Of course, interference can also arise from other factors outside a given system such as from non-system transmitters or other equipment that emits electro-magnetic radiation in an interfering manner.

Interference, whether intentional such as from attempts at signal jamming, or unintentional, has long plagued wireless communication devices. Perhaps the earliest coordinated effort to control levels of interference were undertaken by the International Electrotechnical Commission (IEC) in Paris. It is this group that spawned the International Special Committee on Radio Interference (CISPR) to address what at the time was an emerging problem of electromagnetic interference. As a result, CISPR published technical documents outlining measurement and test techniques and also recommended emission limits. These efforts have since spread and evolved into formalized efforts around the world to control or mitigate the effects of interference with communication systems. For example, not only has the FCC imposed limits on electromagnetic emissions from electronic equipment, but it also manages the communication spectrum.

In some wireless systems that are designed to operate in licensed spectrum, most or substantially all of the interference is typically considered "self-interference," with very little, if any, interference arising from entities outside the system. Therefore, any effort to mitigate self-interference in such wireless systems can be of paramount importance. To allow more users to access the licensed spectrum without interfering with one another, cellular and other wireless technologies have relied on multiple access techniques such as time division multiple access (TDMA), orthogonal frequency division multiple access (OFDMA—a multi-user variant of OFDM), and code division multiple access (CDMA). These schemes effectively divide the spectrum so that it can be shared by multiple users to avoid or mitigate the effects of interference among the multiple users.

TDMA techniques allow several users to share the same frequency channel by dividing the channel in to multiple time slots. The users are effectively assigned their own individual time slots in which to transmit. This allows multiple terminals to share the radio frequency channel without 'stepping-on' or interfering with each other's transmission. TDMA is used in 2G cellular systems such as Global System for Mobile Communications (GSM), IS-136, Personal Digital Cellular (PDC) and iDEN. It is also used in the Digital Enhanced Cordless Telecommunications (DECT) standard for portable telephones.

CDMA techniques employ spread-spectrum technology and a coding scheme that assigns a code to the transmitters to allow them to be multiplexed over the same radio channel. In CDMA the signal is multiplied by a pseudo-noise code sequence referred to as a chip sequence. The resulting coded signal is transmitted over the radio channel. Various forms of coding can be using, including for example, maximal length sequences and Walsh-Hadamard (W-H) codes. W-H codes are considered ideal because they are perfectly orthogonal—that is they are optimal to avoid interference among multiple users.

OFDM is a frequency-division multiplexing scheme in which a large number of closely spaced orthogonal subcarriers are assigned to carry data—that is, the data is divided into multiple channels, one for each subcarrier. Each subcarrier is modulated at a low symbol rate, maintaining total data rates similar to conventional single-carrier modulation schemes in the same bandwidth. Advantageously, conventional modulation schemes such as QAM (Quadrature Amplitude Modulation) or PSK (Phase Shift Keying) can be used. OFDM is used for wired and wireless communications in applications such as digital television, wireless networking and broadband internet access. OFDM is ideal for its ability to handle channel conditions such as attenuation of high frequency components over long copper runs, narrowband interference and frequency-selective multipath fading.

OFDMA is a multi-user version of OFDM in which the subsets of subcarriers are assigned to individual users, allows simultaneous low data rate transmission from multiple users of a single channel. OFDMA is an alternative to combining OFDM with TDMA. The low data rates allow continuous low power transmissions rather than bursty high-power signals. OFDMA is widely utilized for broadband wireless networks due to scalability and low power requirements. OFDMA is used in IEEE 802.XX standards such as WiMAX and WBA, Qualcomm Flarion Technologies Mobile Flash-OFDM (Fast Low-latency Access with Seamless Handoff Orthogonal Frequency Division Multiplexing), and the 3GPP Long Term Evolution (LTE) downlink.

Conventionally, links in wireless systems are classified into two categories depending on the transmitting entity. The "downlink" refers to transmissions from an infrastructure element such as an access point or a base station to a handset or wireless terminal. The "uplink" refers to transmissions from the wireless terminal to the infrastructure element. It is widely understood that uplink transmissions from wireless terminals are much more challenging from an interference mitigation perspective than are downlink transmissions. In the case of downlink transmissions from access points to wireless terminals, a fixed number of transmitting elements are typically at a static location, and transmit at a nominally known total power. The interference profile due to these transmitters is relatively straightforward to quantify and characterize. On the other hand, in the case of uplink transmissions, there are typically a variable number of wireless terminals within communicative reach of an access point, and these terminals often move around—sometimes from one access point's coverage to another's. Also, the transmission power of the wireless terminals can vary depending on factors such as distance from the access points and the data rate that needs to be transmitted. Quantifying and characterizing an interference profile or profiles for the uplink can be a more challenging task.

When a wireless terminal transmits to its intended access point, it typically results in spillover interference to neighboring access points. Because of the variability in terminal locations, the interference caused as a result is highly variable and much more difficult to characterize or predict. This variability can be amplified when uplink transmissions from wireless terminals comprise high-rate bursty data transmissions rather than more predictable circuit voice transmissions.

BRIEF SUMMARY OF EMBODIMENTS OF THE INVENTION

The present invention is directed toward a system and method for providing control of power for mitigation or control of interference in a wireless communications environment. In one embodiment, power control techniques can consider the effects of interference cancellation before making power control determinations. In another embodiment, the effects of interference, or the possible effects of interference, by one or more terminals are evaluated and used in making scheduling and other resource determinations. For example, access points in the network can measure known signals such as pilot signals from wireless terminals communicating through neighboring access points. Additionally, effects of specific wireless terminals can be identified and evaluated, and interference mitigation, such as power level control, can be considered and applied on a terminal-specific basis.

According to an embodiment of the invention a method for mitigating interference caused to a first network access point by a first wireless terminal that is attached to the network via a second access point is provided and includes the operations of: the first access point identifying an interfering transmission from the first wireless terminal that is causing interference to the first access point; the first access point performing an interference cancellation operation on the interfering transmission; the first access point determining a level of success of the interference cancellation operation; the first access point sending a message to the second access point indicating the level of success of the interference cancellation operation; the second access point receiving the message indicating the level of success of the interference cancellation operation performed at the first access point; and the second access point controlling an uplink transmission power level of the first wireless terminal as a function of information in the message indicating the level of success of interference cancellation performed by the first access point. In one embodiment, the message sent from the first access point to the second access point is sent directly to the second access point, or indirectly via an access point controller. The first access point can, in some embodiments, autonomously identify the interfering transmission from the first wireless terminal that is causing interference to the first access point. In further embodiments, the operation further includes the first access point receiving an identification of wireless terminals in the network and using this information to identify the interfering transmission from the first wireless terminal.

In another embodiment, an access point configured to mitigate interference caused by a first wireless terminal that is attached to the network is provided and includes: an interference determination module configured to identify an interfering transmission from a first wireless terminal that is causing interference to the access point; an interference cancellation module configured to perform an interference cancellation operation on the interfering transmission; a cancellation success evaluation module configured to determine a level of success of the interference cancellation operation; a first cancellation results communication module configured to send a message to another access point indicating the level of success of the interference cancellation operation; a second cancellation results communication module configured to receive a message from another an access point experiencing interference, the received message indicating a level of success of an interference cancellation operation performed at that access point; and an uplink transmission power control module configured to control an uplink transmission power level of the first wireless terminal as a function of information in the received message indicating the level of success of interference cancellation performed by the access point experiencing interference. The apparatus can further include a communication module configured to receive an identification of wireless terminals in the network, and wherein the identification information is used in identifying the interfering transmission from the first wireless terminal that is causing interference to the access point.

In yet another embodiment, a method for mitigating interference caused to a first network access point by a first wireless terminal that is attached to the network via a second access point includes receiving at the second access point information indicating a level of success of interference cancellation performed at the first access point on an interfering signal generated by the first wireless terminal; and the second access point controlling an uplink transmission power level used by the first wireless terminal as a function of the received information indicating the level of success of interference cancellation performed by the first access point. In some embodiments, when the received information indicating a level of success of interference cancellation indicates that the interference caused by the first terminal is at or below a determined threshold, controlling the uplink transmission power level comprises increasing a maximum permitted uplink transmission power level that can be used by the first wireless terminal when transmitting to the second access point. Likewise, when the received information indicating a level of success of interference cancellation indicates that the interference caused by the first terminal is at or above a determined threshold, controlling the uplink transmission power level comprises decreasing the maximum permitted uplink transmission power that can be used by the first wireless terminal when transmitting to the second access point.

The method can further include sending interference cancellation information to the first access point, the interference cancellation information to be used in an interference cancellation operation at the first access point. The interference cancellation information can include a scrambling code corresponding to uplink signals transmitted by the first wireless terminal, wherein the scrambling code is used for uplink data traffic transmissions from the first wireless terminal to the second wireless access point. The interference cancellation information can also include at least one terminal specific parameter, the at least one terminal specific parameter comprising a transmission timing offset or a pseudo-random time-frequency hopping pattern.

The method can also include determining whether to adjust the transmission power level used by the first wireless terminal based on the level of success of the interference cancellation. In some embodiments, determining whether to adjust the transmission power level used by the first wireless terminal is performed by the first access point, the second access point or an access controller.

In still another embodiment, a method of operating a second access point which is subject to interference from signals transmitted by a first wireless terminal to a first access point includes: receiving information about a transmission from the first wireless terminal to the first access point; performing an interference cancellation operation on a signal received from the first wireless terminal at the second access point using the received information; determining a level of success of the interference cancellation operation; and sending information to the first wireless terminal indicating the level of success of the interference cancellation operation, wherein the information indicating the level of success of the interference cancellation operation is sent to the first access point so that it can be used in uplink power control of the first wireless terminal by the first access point. In some embodiments, the information about the transmission from the first wireless terminal to the first access point comprises a scrambling code corresponding to uplink signals transmitted by the first wireless terminal, a transmission timing offset or a pseudo-random time-frequency hopping pattern. In various embodiments, the information about the transmission from the first wireless terminal to the first access point comprises a scrambling code corresponding to uplink signals transmitted by the first wireless terminal, a transmission timing offset or a pseudo-random time-frequency hopping pattern.

A second access point can be provided which is subject to interference from signals transmitted by a first wireless terminal to a first access point, the second access point comprising: a receiver module configured to receive information about a transmission from the first wireless terminal to the first access point; an interference cancellation module configured to perform an interference cancellation operation on a signal received from the first wireless terminal at the second access point using the received information; means for determining a level of success of the interference cancellation operation; and a communication module configured to send information to the first wireless terminal indicating the level of success of the interference cancellation operation, wherein the information indicating the level of success of the interference cancellation operation is sent to the first access point so that it can be used in uplink power control of the first wireless terminal by the first access point. In various embodiments, the information about the transmission from the first wireless terminal to the first access point comprises a scrambling code corresponding to uplink signals transmitted by the first wireless terminal, a transmission timing offset or a pseudo-random time-frequency hopping pattern.

The apparatus and methods described above can be implemented in a processor based system including a computer readable medium comprising computer executable instructions stored thereon, which, when executed control a second access point to perform the operations described above.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

The present invention is directed toward a system and method for providing control of power for mitigation or control of interference in a wireless communications environment. In one embodiment, power control techniques can consider the effects of interference cancellation before making power control determinations. For example, where interference with a base station from an interfering or offending terminal is being canceled such that the effects of that interference are not adversely affecting operations of the base station, there is no need to reduce the power of the offending terminal. Accordingly, the offending terminal can be left unchanged, or its uplink transmit power might even be increased. On the other hand, where the interference cancellation operation is not able to cancel the effects of the interfering signal sufficiently, the operation can lower the uplink transmit power of the offending signal so as to not cause interference to the other base station. In some embodiments, the success of interference cancellation can be determined based on the SIR or SINR at the receiver. If as a result of the interference cancellation the SIR or SINR is above a predetermined threshold, then the interference cancellation is successful.

In another embodiment, the SIR or SINR can be compared before and after interference cancellation of a given signal. If the level of improvement of the SIR or SINR is greater than a predetermined threshold, then the interference cancellation can be deemed successful. Accordingly, for example, even if the overall SIR or SINR is not ideal (for example, due to other sources of interference), the success of the interference cancellation of a single signal from an offending terminal can itself be determinative of whether the uplink power of that offending terminal should be adjusted. As such, in scenarios where interference is caused by multiple wireless terminals, the effects of interference cancellation on interfering signals from individual terminals can be considered and addressed.

In another embodiment, the effects of interference, or the possible effects of interference, by one or more terminals are evaluated and used in making scheduling and other resource determinations. For example, access points in the network can measure known signals such as pilot signals from wireless terminals communicating through neighboring access points. A control module can evaluate the signal transmissions measured by the access points and make configuration or scheduling determinations to help avoid interfering operations or to mitigate the effects of the interference.

Figure 1:
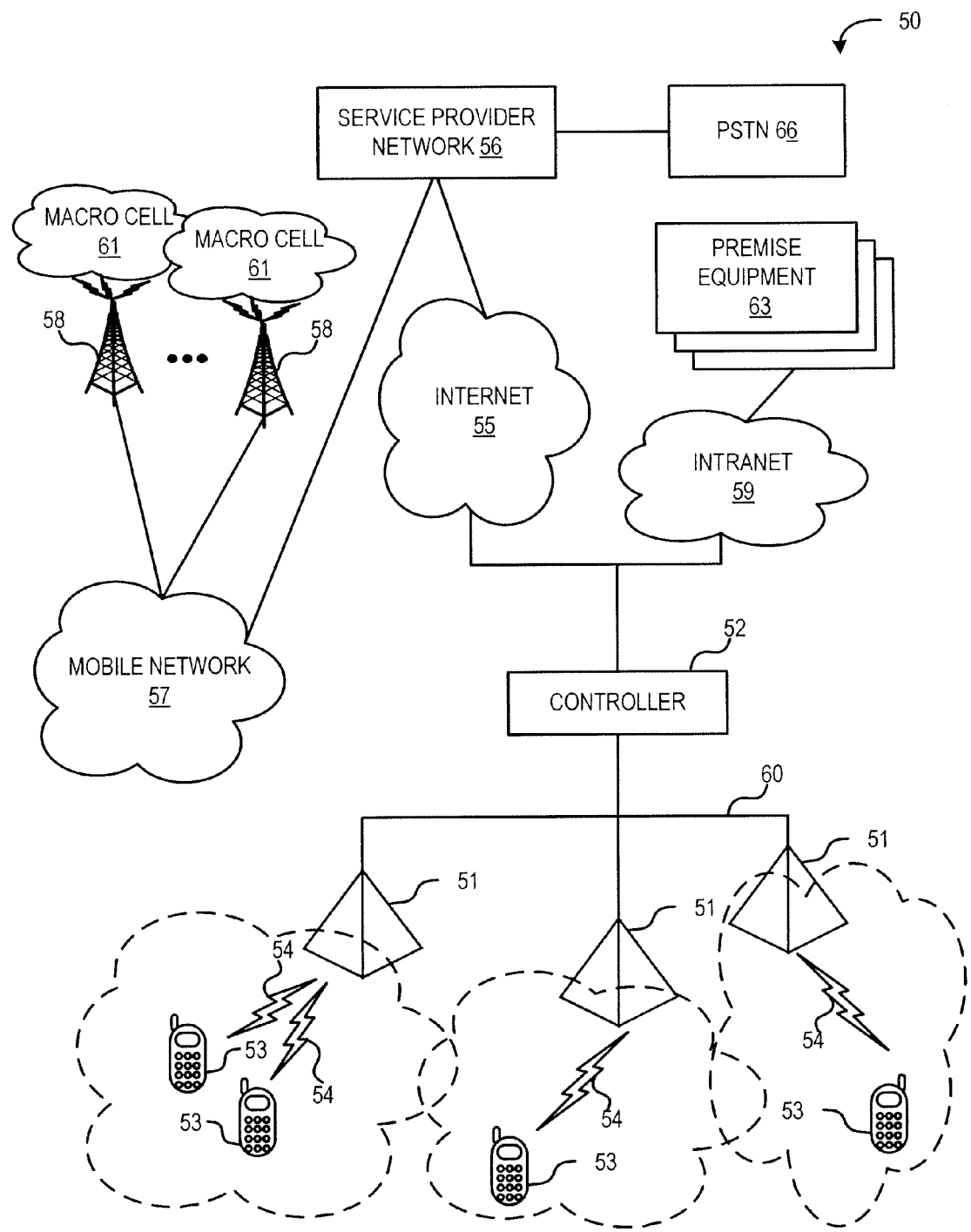
FIG. 1 is a drawing illustrating an example environment within which the methods and apparatus described herein can be implemented.

Before describing the invention in detail, it is useful to describe an example environment in which the invention can be implemented. One such example is that of a centrally-controlled femtocell system. FIG. 1 is a diagram illustrating a simplified architecture for such an example environment. In this example environment, one or more femtocells provide cellular coverage for wireless terminals. In some embodiments, wireless terminals can include handsets or other user equipment such as, for example cellular phones, smart phones, laptops, handheld communication devices, handheld computing devices, satellite radios, global positioning systems, PDAs, and/or any other suitable device for communicating over the wireless communication system.

In the illustrated example, femtocells 51 serve as base stations to provide cellular coverage over an air interface 54 to user equipment 53 within their respective areas of coverage. For example, femtocells 51 may be deployed at various locations within a building or other structure to provide cellular coverage to user equipment 53 within the building or structure. This can be advantageous, for example, in large buildings, underground facilities, within aircraft or other transportation vehicles, and within other structures and locations where conventional macro cell coverage is weak or insufficient. Femtocells can also be deployed in environments where it is desirable to augment the capacity of the conventional macrocellular network. Consider the case of a building with a plurality of femtocells distributed therein. In such an environment, the user equipment 53 registers with a femtocell 51 in its range within the building. As the user moves throughout the building, her cellular handset (or other terminal) may be handed off from one femtocell 51 to another to provide suitable coverage for her user equipment 53 as she moves within the building.

In various embodiments, user equipment 53 may comprise, for example, a cellular or mobile handset, a PDA having cellular system access, a laptop with cellular system access for data transmission over cellular systems, or other devices capable of accessing licensed spectrum communications networks for voice or data transmissions. In such applications, femtocells 51 are wireless access points configured to operate within the licensed spectrum to serve as base stations for the user equipment within their range. In other embodiments, femtocells 51 can be implemented as wireless access points for communications with compatible wireless terminals over proprietary or other non-licensed air interface. Although femtocells 51 are illustrated as exclusively wireless access points, embodiments can be implemented wherein femtocells 51 are implemented with wired interfaces to user equipment or a combination of wired and wireless interfaces.

As noted above, femtocell 51 operates as a base station and relays voice and data communication between the user equipment 53 and an end destination. For example, the end destination can be other user equipment within the building (for example, other wireless terminals 53, or other premise equipment 63), a cellular handset operating on a macro cell 61, the PSTN 66, Internet 55 accessible devices and so on.

In the illustrated environment, the femtocells 51 are centrally controlled by a controller 52, sometimes referred to as an access controller. Controller 52 may perform various functions, such as, for example, monitoring operations, coordinating communications among user equipment 53, relaying communications between user equipment 53 and other entities, licensed spectrum allocation, or load balancing amongst the femtocells 51. Femtocells 51 can be connected to access controller 52 via a backhaul 60 which can be implemented using a number of different communication topologies. The connections between the femtocells 51 and the access controller 52 could be dedicated, or the access points and controller could be coupled to one another via a switching network, such as a gigabit Ethernet network, for example.

Femtocells 51 are configured to provide cellular system access by transmitting voice and data transmissions to controller 52, which routes the communications via a packet switched network, such as the Internet 55, via an Intranet 59 or other communication path as appropriate. Accordingly, in some environments controller 52 may comprise a router or switch configured to allow the femtocells 51 to share a network connection and to access networks 55, 59. Controller 52 may also be configured to make routing determinations from among the various entities such that communications with a given wireless terminal 53 may be routed to at least one of the mobile network 57, other femtocells 51 other premise equipment 63 attached to the intranet 59, or other entities as may be accessible by controller 52.

In some examples, the system may further comprise a local intranet 56. For example, the controller 52 and femtocells 51 may be maintained by or integrated with an entity, such as a business or organization that also maintains its own local intranet 56. In some cases, users of the user equipment 53 may desire access to the intranet 56, such as for local data transfers or local voice calls. In such environments, the controller 52 may also mediate these communication activities.

The example environment further comprises a service provider network system 56. For example, the service provider network system may comprise a 2G or 2.5G network such as GSM, EDGE, IS-95, PDC, iDEN, IS-136, 3G based network such as GSM EDGE, UMTS, CDMA2000, DECT, or WiMAX, or any other cellular or telecommunications or other network. Service provider network system 56 further comprises a cellular network 57, that can include mobile switching centers, base station controller and base stations 58 configured to provide macro cell coverage 61 in the environment.

Sometimes, the coverage area of macrocell 61 may overlap with that of femtocells 51, in such cases the controller 52 or the femtocells 51 may provide methods for mitigating interference between the elements. In some instances, user equipment 53 may move from areas covered by femtocells 51 to areas covered by macrocell 61. In these cases, the controller 52 may provide methods for handing off calls from the femtocells 51 to the macrocell 61. In other cases, the network system 56 or other network elements may mediate these transitions.

From time-to-time, the present invention is described herein in teens of these example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

For example, the innovations described herein often refer to access points and access controllers. As would be apparent to one of ordinary skill in the art after reading this description depending on the nature of the innovation, various embodiments may implement these components as components of a femtocell network (such as the example described with reference to FIG. 1, or as other access point and controller elements (e.g., base stations and base station controllers) in macro cells, other radio area networks, or other like topologies. Additionally, in peer-to-peer environments, coordination and control mechanisms can be assigned to and distributed amongst the various peer elements, or certain peers may be designated as super peers with additional control mechanisms over the other peers. Super peers can be identified, for example, when the network configuration is mapped and network neighbors identified. Accordingly, access point and access controller functions can, in some embodiments, be distributed amongst peers, delegated to super peers, or shared amongst peers and super peers.

For instance, in 3GPP HSUPA systems (UMTS Release 6), the infrastructure element access point or base station is referred to as a "NodeB." The serving NodeB is responsible for allocating a maximum transmit power resource to a wireless terminal (referred to as user equipment, user element or UE in UMTS specifications). In 3GPP LTE (Long Term Evolution) and like systems, uplink power control utilizes a closed-loop scheme around an open-loop point of operation. The uplink performance of the network is decisively influenced by power control. In 802.16 WiMAX systems, the serving base station is responsible for allocating an OFDMA resource element as well as potentially a maximum transmit power resource to the wireless terminal (called Subscriber Station or SS in the WiMAX specifications). Although many of the examples provided herein are described in terms of a UMTS application, after reading this description one of ordinary skill in the art will understand how these techniques can be implemented in alternative environments.

Although the environments described above can be characterized as a femtocell, macro cellular network or other like topological structure, the methods and apparatus described herein are also well suited to other scenarios, environments and applications, such as a wireless network or a system deployment that has no access controller but comprises distributed wireless access points, which can communicate in a peer-to-peer manner. The innovations described herein are not constrained by the actual choice of wireless protocol technology or network topology, but may be implemented across a wide range of applications as will be appreciated by one of ordinary skill in the art after reading this description.

The innovations described herein are applicable to licensed-spectrum-based cellular technologies in which infrastructure elements such as base stations or access points are provided as entities in the system with some level of coordination. In addition, the innovations are also applicable to unlicensed-spectrum with or without coordinating entities, including, for example, technologies such as WiFi and other technologies that employ peer-to-peer communication techniques.

In hierarchical systems, various functions described herein can be centralized in a control node such as a base station controller or access controller; distributed among like nodes such as base stations or access points; or distributed throughout the hierarchy in base stations and base station controllers. Also, the functions can be included in wireless terminals as well. However, a preferred embodiment relies on base stations or base station controllers to exchange information and instructions and can use wireless terminals in the manner designed for existing networks so as to avoid the need to update or modify existing wireless terminals or run a thin client on the terminals. For example, as certain of the below-described embodiments illustrate, the access points can be configured to instruct the wireless terminals to transmit known signals (such as pilot signals, for example); and can use existing control mechanism such as uplink power control. The systems can also be configured to take measurements of wireless terminal operations to make decisions to avoid, reduce or minimize interference. Other embodiments may place some of these control mechanisms on the wireless terminals or make other distribution of functionality than those examples described herein.

In peer-to-peer environments, coordination and control mechanisms can be assigned to and distributed amongst the various peer elements, or certain peers may be designated as super peers with additional control mechanisms over the other peers. Super peers can be identified, for example, when the network configuration is mapped and network neighbors identified.

Various innovations are described in this document in the context of an exemplary embodiment of the system, such as the example environment described above with reference to FIG. 1, which comprises multiple wireless access points, coupled to an access controller. The connections between the access points and the controller could be dedicated, or the access points and the controller could be coupled to one another via a switching network, such as a gigabit Ethernet network, for example. It should be noted that the innovations are also applicable to wireless system architectures that differ from the example environment and exemplary embodiments described herein, such as a completely distributed system that involves access points that can communicate between themselves in a peer-to-peer manner.

Figure 2A:
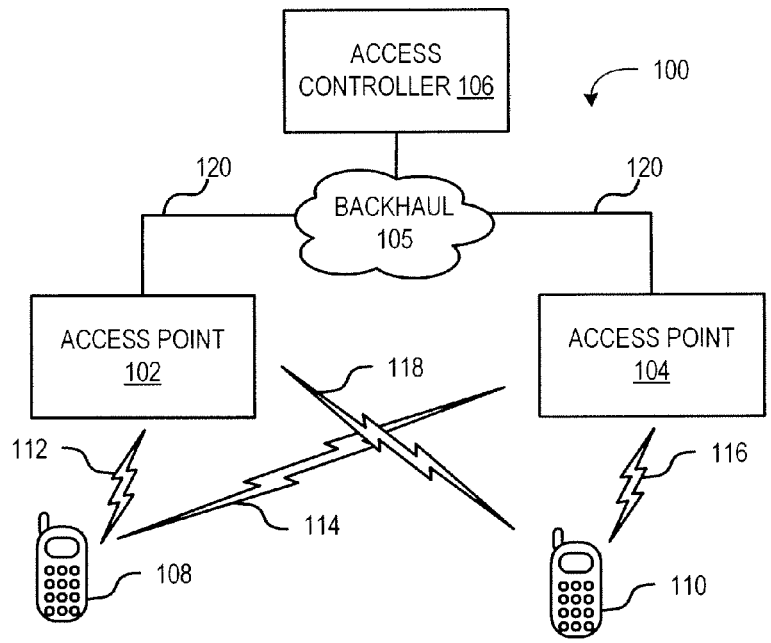
FIG. 2A is a drawing illustrating exemplary path losses between access points and wireless terminals.

FIG. 2A is a diagram illustrating an example system architecture in accordance with one embodiment of the invention. Referring now to FIG. 2A, this example architecture 100 includes an access controller 106, a plurality of wireless access points 102, 104, and a plurality of wireless terminals 108, 110. Although there can be more than two wireless terminals 108 and more than two access points 102, 104 communicating with an access controller 108, only two of each are illustrated for simplicity and ease of description. In this simple example, access points 102, 104 are linked to access controller 106 via a backhaul network 105, which can be implemented using a number of different network topologies including, for example, a gigabit Ethernet network. As would be apparent to one of ordinary skill in the art after reading this description, other forms of backhaul 105 connection can also be provided. Access controller 106 in various embodiments, can be configured to control access points 102, 104, as well as share information among access points 102, 104.

Although illustrated as a separate box in example architecture 100, in another embodiment, the functionality of access controller 106 can be embedded in one or both access points 102, 104. Accordingly, rather than communicate with access controller 106 via communication paths 120, access points 102, 104 may communicate with each other directly or indirectly via a separate communication path in environments where information is shared between access points 102, 104.

In considering the uplink scenario, each wireless terminal 108, 110 is assumed to be primarily controlled by a respective serving access point 102, 104. In this document, a wireless terminal is sometimes referred to as being registered with its serving or controlling access point. However, depending on the proximity of access points 102, 104 and the locations of wireless terminals 108, 110, signals from either of the wireless terminals 108, 110 may interfere with their respective non-controlling access point 102, 104. To elaborate, consider the example illustrated in FIG. 2A in which it is assumed that wireless terminal 108 is registered with or controlled by access point 102, and wireless terminal 110 is registered with or controlled by access point 104. Accordingly, uplink transmissions 112 from wireless terminal 108 are intended to be routed through access point 102, while uplink transitions 116 from wireless terminal 110 are intended to be routed through access point 104. Accordingly, in the illustrated example it is shown that transmissions by wireless terminal 108 may cause interference 114 with access point 104, and transmissions by wireless terminal 110 may cause interference 118 with access point 102.

One challenge in uplink resource allocation that may be faced by a serving access point is to allocate radio resources to its registered wireless terminals in order to meet throughput requirements while ensuring that the resulting interference caused to non-serving access points is minimized or limited. In some applications, increasing uplink resource allocations by a given access point to receive transmissions above the noise can cause cascading effects across the entire network as other access points react by ramping up their own power control loops in order to raise the receptions from their wireless terminals above the rising interference floor.

In order to define the context more accurately, some notation is useful. Consider a network of M access points and N wireless terminals. Let the path loss from wireless terminal 'i' to base station 'j' be $l_{ji}$. Suppose the transmit power of wireless terminal 'i' is represented by $p_i^T$. Then, the total uplink power received at base station 'j' is given by $$\sum_{i=1}^{N} l_{ji} p_i^T.$$

Assuming a thermal noise floor power of w, the signal-to-interference-plus-noise ratio (SINR) for the transmission from wireless terminal 'k' to access point 'j' is given by $$\gamma_k = \frac{l_{jk} p_k^T}{\sum_{i \neq k} l_{ji} p_i^T \alpha_{ik} + w}. \quad \text{Eqn [1]}$$

In this expression, $\alpha_{ik}$ denotes the degree of non-orthogonality between the transmissions of wireless terminal 'i' and wireless terminal 'k', which is a function of several factors: the nature of the air-interface (CDMA or OFDMA for example), the nature of the uplink base-station receiver (Rake or Interference Cancellation Receiver in the case of CDMA), and so on. Typically, control channels used by wireless terminals in the uplink are specified to require a minimum SINR in order to function reliably. As can be seen from Eqn [1], this would involve a complete knowledge of each of the path losses from each of the wireless terminals to each of the base stations, and would also involve knowledge of the instantaneous transmit powers of each and every wireless terminal.

This is an impractical solution, and therefore, many wireless systems alternatively control by what is called "Rise-over-Thermal", or RoT, which is defined by $$R_j = \frac{\sum_i l_{ji} p_i^T + w}{w} \quad \text{Eqn [2]}$$

Rather than trying to control the SINR of each transmission precisely, many commercial wireless systems typically adopt a simpler approach to uplink resource allocation. Access points typically allocate transmit power and other resources to wireless terminals in such a manner that the RoT is maintained at a pre-determined level with high confidence. This increases the likelihood that the control channels may be decoded reliably while data transmissions are maximized or nearly maximized.

Many commercial wireless systems also build in precautionary distributed mechanisms to try to ensure that resource allocation by individual access points do not cause cascading uplink interference effects. For instance in 3GPP UMTS HSUPA systems, a Relative Grant Channel (RGCH) allows non-serving eNodeBs to control the power of wireless terminals (UEs) that are being served and provided resource allocations by some other eNodeB. In 3GPP2 CDMA2000 systems, a congestion bit is broadcast from every base station when the aggregate RoT rises above a certain threshold. Every wireless terminal that can detect this congestion bit, including those served by other base stations, reduces its transmit power in order to decrease the overall RoT across the system. However, this distributed approach is reactive, which is suitable for traffic patterns such as voice or long FTP uploads in which the interference patterns are discernible over a longer time-window, may not be suitable for other traffic patterns.

In some embodiments of the apparatus, a proactive and more tightly controlled uplink radio resource allocation can be provided. This can be accomplished, for example, by monitoring the effects of and controlling wireless transmitters on an individualized basis to target noise reduction efforts to sources of interference, and allow flexibility to devices that are not interfering with neighboring base stations.

Various aspects relating to determination and distribution of path-loss information are now described. In the example system implementation illustrated in FIG. 2A, access controller 106 receives information from access points 102, 104. In one embodiment, access controller 106 is configured to assimilate path-loss information from various wireless terminals (108, 110 in this example) to multiple access points (102, 104 in this example). In other words, the set of values $\{l_{ji}, j=1, \ldots M, i=1, \ldots, N\}$ can be provided to and used by access controller 106, to provide a level of control to interference within the system 100. Access controller 106 can accomplish this in a number of ways.

Figure 2B:
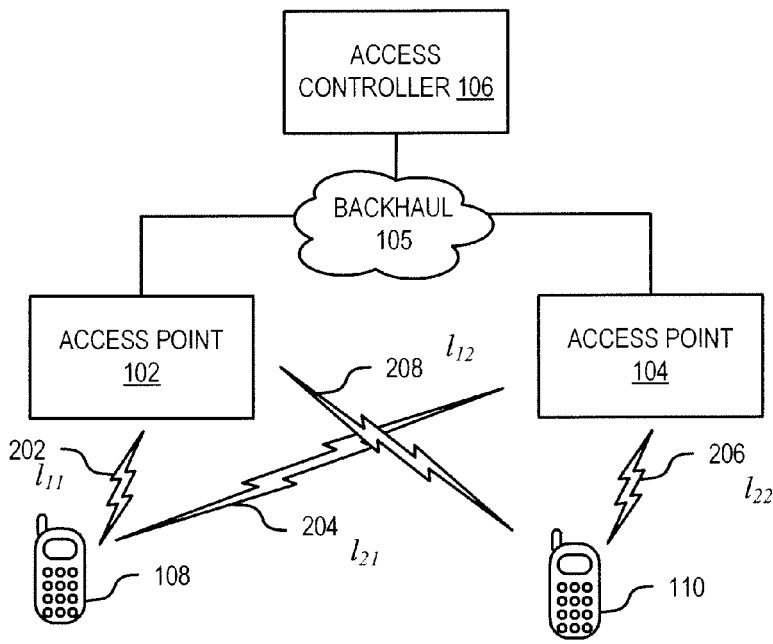
FIG. 2B illustrates exemplary estimation of path losses between the exemplary access points and wireless terminals shown in FIG. 2A.

FIG. 2B illustrates exemplary estimation of path losses between the exemplary access points 102, 104 and wireless terminals 108, 110 shown in FIG. 2A. $l_{11}$ 202 represents path loss between access point 102 and wireless terminal 108; $l_{12}$ 208 represents path loss between access point 102 and wireless terminal 110; $l_{21}$ 204 represents path loss between access point 104 and wireless terminal 110; $l_{22}$ 206 represents path loss between access point 104 and wireless terminal 110.

In a UMTS system, for example, the radio network controller can be configured to instruct or command a wireless terminal to measure the downlink pilot (DL-CPICH) strengths from base stations (nodeBs or eNodeBs) other than the base station that is currently serving the wireless terminal. This is typically done to assist soft-handoff between base stations. However, this information, in some embodiments, may also be used for interference mitigation. Because the radio network controller is aware of the power at which the downlink pilot is transmitted from each base station, the measured receive power value at the wireless terminal provides a good estimate of the path loss in the downlink direction. Even though the uplink and downlink frequency bands in a Frequency Division Duplex (FDD) system typically experience independent fading, a time-averaged value of the downlink path-loss can provide an acceptable estimate of the time-averaged value of the uplink path loss. This is because the timescale at which fading typically occurs (e.g., tens of milliseconds) is much faster than the timescale at which the path-loss itself typically changes due to the movement of the wireless terminal (e.g., tens of seconds).

In some embodiments, the estimate of path loss can be used to determine the level of interference that may be caused by a particular wireless terminal on a particular access point. For example, user terminals with small path-losses to neighboring access points (other than their serving access point) may be restricted in the amount of power they can transmit. Examples of how path loss measurements are used are described in more detail below.

In another UMTS embodiment, the radio network controller can be configured to request a non-serving base-station to measure the uplink receive power on the pilot transmitted on the UL-DPCCH (the uplink dedicated physical control channel) of a wireless terminal in question. In a UMTS system, each wireless terminal transmits using a unique scrambling code, which can be decoded by the base station. The base station can be configured to allocate a receiver processing chain, measure the pilot value and report it to the radio network controller. The wireless terminal also periodically transmits an uplink power headroom indicator, which quantifies the difference between its current transmit power and its maximum transmit power, providing information to the base station of the terminal's available power resources. This can be, for example, the UE power headroom, or UPH, quantified as a ratio of the maximum transmission power of the wireless terminal and the corresponding DPCCH code power. In addition, the radio network controller is aware of the capability class of the wireless terminal, which can also quantify its maximum transmit power. The uplink path loss from a particular wireless terminal to a specific base station may be sufficiently determined from the uplink receive power on the UL-DPCCH pilot, the UE power headroom and the maximum transmit power of the wireless terminal, which are typically known at the base station.

An example for determining uplink cell-load information is now described. The example is provided in terms of a UMTS application, but after reading this description one of ordinary skill in the art will understand how uplink cell-load information can be utilized in alternative environments. In a UMTS access point (nodeB), the total uplink rise-over-thermal ($R_j$ from Eqn. [2]) is determined and can be reported to the RNC. Further, the summation of received powers in the numerator of Eqn. [2] may be partitioned into transmissions from wireless terminals served by the base-station and external transmissions. This allows the RNC to determine the actual interference budget that is consumed and that which is available after the in-cell transmissions by served wireless terminals are taken into account. In the UMTS System, if the total uplink rise-over-thermal due to external transmissions is exceeded, the access point may transmit an indication to each of the wireless terminals that are not served by that access point to reduce their transmit power. (This indication is sent on the non-serving relative grant channel (RGCH)). This process reduces the transmit powers of each of the wireless terminals, including those that were not the primary source of the interference. Accordingly, wireless terminals may have their power reduced unnecessarily, which can degrade the QOS of the system overall.

Accordingly, in some embodiments the access point experiencing the interference identifies one or more specific wireless terminals that are the source of the interference. For example, a wireless terminal causing interference above a predetermined threshold or magnitude can be identified. Once the wireless terminal causing an undue amount of interference is identified, the access point experiencing the interference causes the access point serving the offending wireless terminal to limit the offending terminal's power. In embodiments such as that described in FIG. 2B, for example, the access point experiencing the interference can be configured to send a communication via access controller 106 to the access point controlling the interfering wireless terminal. In some embodiments, such an indication can be preserved until the serving access point detects a change in the channel condition or, in another embodiment, the process can be conducted on a periodic basis at predetermined intervals.

The identification of the interfering wireless terminal can be achieved by estimating the power on the uplink pilot and decoding the enhanced uplink (EUL) control channels. These two metrics together can provide an estimate of the total link power, and hence the interference. As the access point does not need to demodulate the data bits on the interfering wireless terminal, this can be done quickly and with high confidence. In the UMTS framework, the decision would utilize only ⅓ of a sub-frame to perform this detection. Thus a single receive chain can be used to monitor multiple links.

Various aspects related to interference mitigation through the utilization of path-loss and/or cell load information will now be described. A variety of scheduling mechanisms can be employed to mitigate uplink interference in a proactive manner by utilizing the path-loss information from the wireless terminals to the access points as well as the uplink rise-over-thermal measurements from the access points.

In one embodiment, the interference cost associated with transmissions from a wireless terminal 'i' at access point is given by $p_i^T l_{ji}$. The uplink scheduler in the access-point may judiciously choose the transmit power of wireless terminal 'i' so that the interference cost is always below a given threshold, t. That is $p_i^T l_{ji} \leq t$ In another embodiment, the total interference cost associated with each of the transmissions by wireless terminals controlled by a certain access point is $$\sum_i p_i^T l_{ji} \leq t.$$

This limits the total interference cost at access point 'j' due to each of the transmissions controlled by mobiles associated with another access point.

The cell-load, in some embodiments, is explicitly considered in interference cost calculations. For instance, in one UMTS HSUPA embodiment, a serving access point restricts the uplink transmit power allocated to a wireless terminal that has a low path-loss to a neighboring non-serving access point, even if its own RoT allows a higher transmit power. In another UMTS HSUPA embodiment, the serving access point varies the thresholds 't' described above depending on the cell-load in neighboring cells. The cell-load information is distributed between access-points as described earlier in this document.

Various embodiments described herein can be implemented to result in proactive control of uplink interference rather than a reactive mechanism that is initiated after interference is detected. These proactive techniques can be suited and applicable for use in, for example, packet-switched wireless systems that experience bursty transmissions, and in which reactive approaches may not be as effective.

Various aspects related to controller-less architectures are described. The techniques described in the context of example embodiments are also applicable to a distributed architecture that does not have an access controller. Consider one embodiment in which the access points are coupled to each other in a peer-to-peer manner. The access points can be configured to conduct a discovery procedure by which the access points discover each other, or the access points can be manually provisioned with this knowledge. Accordingly, such methodologies can be used to allow the access points in the peer network to compile a "neighbor list" of their respective peer access points.

In one embodiment, the access points are configured to instruct their respective registered wireless terminals to measure a downlink reference signal and report this measurement back to the access point. One example of such a reference signal is the DL-CPICH in a UMTS embodiment, or a downlink preamble or common pilots in an 802.16 WiMAX embodiment, or a downlink (pilot) signal in LTE. In some embodiments, the reference signals can also include information to disclose the identity of the transmitting access points. For instance, the combination of primary and secondary synchronization channels, the DL-CPICH and the broadcast channel in UMTS systems can be used to reveal the identity of the transmitting access point.

In such embodiments, each access point receives downlink reference measurements collected by its registered wireless terminals. Each measurement can be, for example, reported as a pairwise-entity $(p_i, s_i)$ where $p_i$ is the measured value of the downlink reference signal and s is the identity of the transmitting access point (determined through a combination of downlink reference signals). Because each access point has a neighbor list, it communicates the identity of the wireless terminals to its neighbors.

Various aspects related to interference cancellation are now described. Various embodiments described above are set in the context of transmit power being controlled by a coordinating entity such as an access point, wherein the control is based on information collected by the network, either through a central controller or through access points, or in a peer-to-peer manner by access points or other network elements. There is another set of techniques, sometimes referred to as interference cancellation, that may be used to mitigate interference at the receiver. In the context of uplink transmissions, an interference canceling receiver estimates the waveforms of transmissions from interfering wireless terminals and attempts to cancel them before decoding desired transmissions from other wireless terminals.

Figure 3:
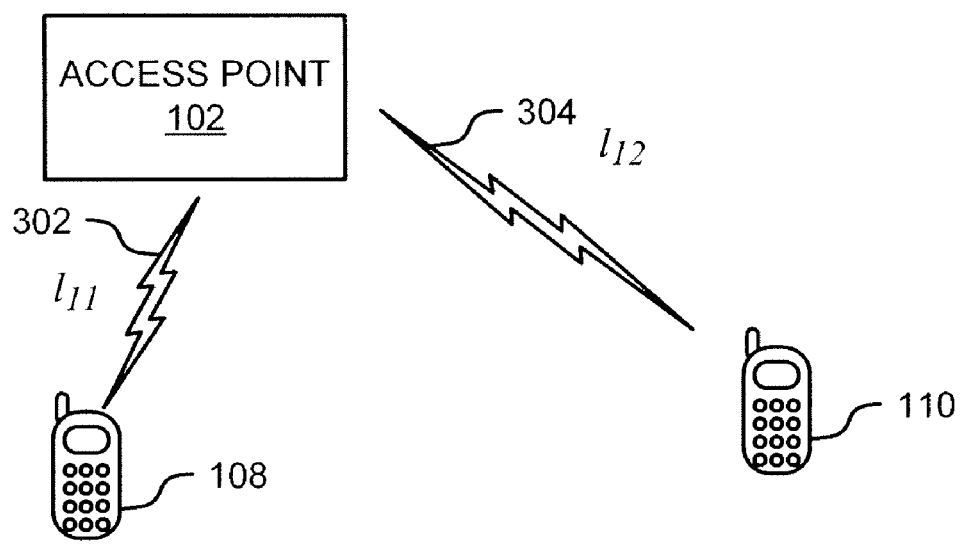
FIG. 3 is a diagram illustrating an example for interference cancellation in accordance with one embodiment of the invention.

FIG. 3 is a diagram illustrating an example for interference cancellation in accordance with one embodiment of the invention. Referring now to FIG. 3, the illustrated example is a scenario wherein access point is configured for operations to receive uplink transmissions 302 from wireless terminal 108. For example, wireless terminal 108 may be registered with access point 102 for communications. However, in this illustrated example scenario, there is also a second wireless terminal 110 within range of access point 102. Wireless terminal 110 is not registered for communications with access point 102 and therefore, its transmissions result in an undesired interference signal 304. Using the nomenclature adopted above, uplink signal 302 from wireless terminal 108 is received at a power of $p_1^T l_{11}$, while the interference signal 304 from wireless terminal 110 is received at a power of $p_2^T l_{12}$.

In some embodiments, the receiver of access point 102 incorporates interference cancellation mechanisms and attempts to cancel interference signal 304 from wireless terminal 110 prior to decoding uplink signal 302 from wireless terminal 108. Conventional techniques known to those of skill in the art can be used for interference cancellation. For example, in some embodiments, the interference signal can be modeled or a reference component such as a pilot signal can be used to estimate the waveform of the interfering signal from wireless terminal 110. This information can be used to subtract the modeled or estimated waveform from the composite signal received by access point 102, thereby canceling out (at least to some degree) the interfering signal. Interference cancellation can be performed using application specific integrated circuits (ASICs), digital signal processors (DSPs) or other digital signal processing devices, programmable logic devices, field programmable gate arrays, and other processors and controllers, or other electronic devices.

Various aspects relating to combined interference mitigation and cancellation are now described. In some exemplary embodiments, each access point is made aware of a list of interfering wireless terminals. There are a number of ways in which this may be achieved. In one embodiment, the downlink reference signals transmitted by access points are measured by their respective registered wireless terminals and reported back to the access controller. Because the reference signals are transmitted at known power, the path losses between the access point and each wireless terminal may be estimated. These path losses can be used to determine interference cost arising from uplink transmissions as described earlier in this document, and to identify those wireless terminals that may be considered to interfere with other access points in the system.

In another embodiment, the access controller is configured to instruct individual access points to attempt estimation of uplink waveforms transmitted by specific wireless terminals. The access points can therefore be configured to assign receiver resources for this purpose. This estimation results in an estimate of the receive signal power from a particular wireless terminal. In some such embodiments, the estimation also results in an estimate of other related parameters such as the multipath profile.

This interference cost calculation can be different depending on the nature of the uplink receiver employed in the access point. If the transmission from a wireless terminal can be substantially cancelled, it has low interference cost even though the signal itself is received at a relatively high power. On the other hand, a group of interfering signals that are received at lower powers may be harder to cancel out, and may end up causing larger aggregate interference.

In an exemplary embodiment, the access controller is configured to inform each access point of a list of interfering wireless terminals. In some UMTS embodiments, this list includes a wireless terminal-specific pair of numbers such as the scrambling code and the timing offset of the wireless terminal's waveform. The access points can be configured to report back to the access controller the quality of interference cancellation of a specific wireless terminal's waveform.

The access controller can then communicate this interference cancellation metric to the particular access point that is responsible for allocating radio resources to the wireless terminal in question. This serving access point then takes into consideration this interference cancellation metric in calculating the interference cost due to a wireless terminal. If the transmissions from a wireless terminal can be cancelled effectively at neighboring access points, this gives the serving access point more latitude in allocating higher power and bandwidth to that wireless terminal. On the other hand, if interference cancellation of a particular wireless terminal proves to be challenging, the serving access point, in some embodiments, constrains the wireless terminal's transmission more severely.

Figure 4:
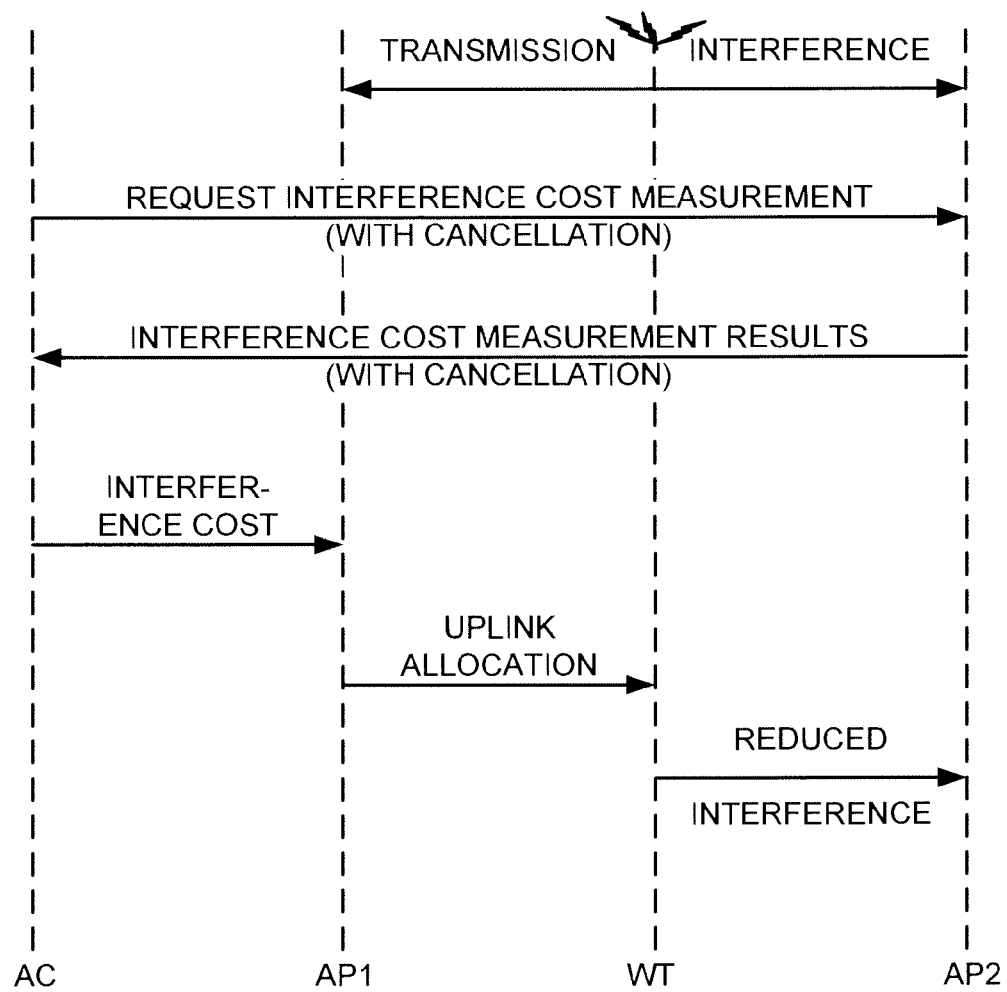
FIG. 4 is a diagram illustrating an example message exchange for interference mitigation and cancellation in accordance with one embodiment of the invention.

FIG. 4 is a diagram illustrating an example message exchange for interference mitigation and cancellation in accordance with one embodiment of the invention. Referring now to FIG. 4, in this example scenario the wireless terminal WT is registered communicate with access AT1. During the course of this communication, wireless terminal WT interferes with access point AT2. The access controller AC instructs access point AT2 to measure the interference cost associated with wireless terminal WT. Access point AT2 calculates interference cost and reports back to access controller AC. Access controller AC informs access point AT1 of the interference being caused by wireless terminal WT. In response, access point AT1 revises the uplink allocation by, for example, reducing the maximum power at which wireless terminal WT is allowed to transmit. As a result, WT communicates with AT1 at a reduced level of interference to access point AT2. As would be apparent to one of ordinary skill in the art after reading this description, a system can be configured wherein the interference cost messaging can take place among peer access points, without the inclusion of an access controller.

Figure 5:
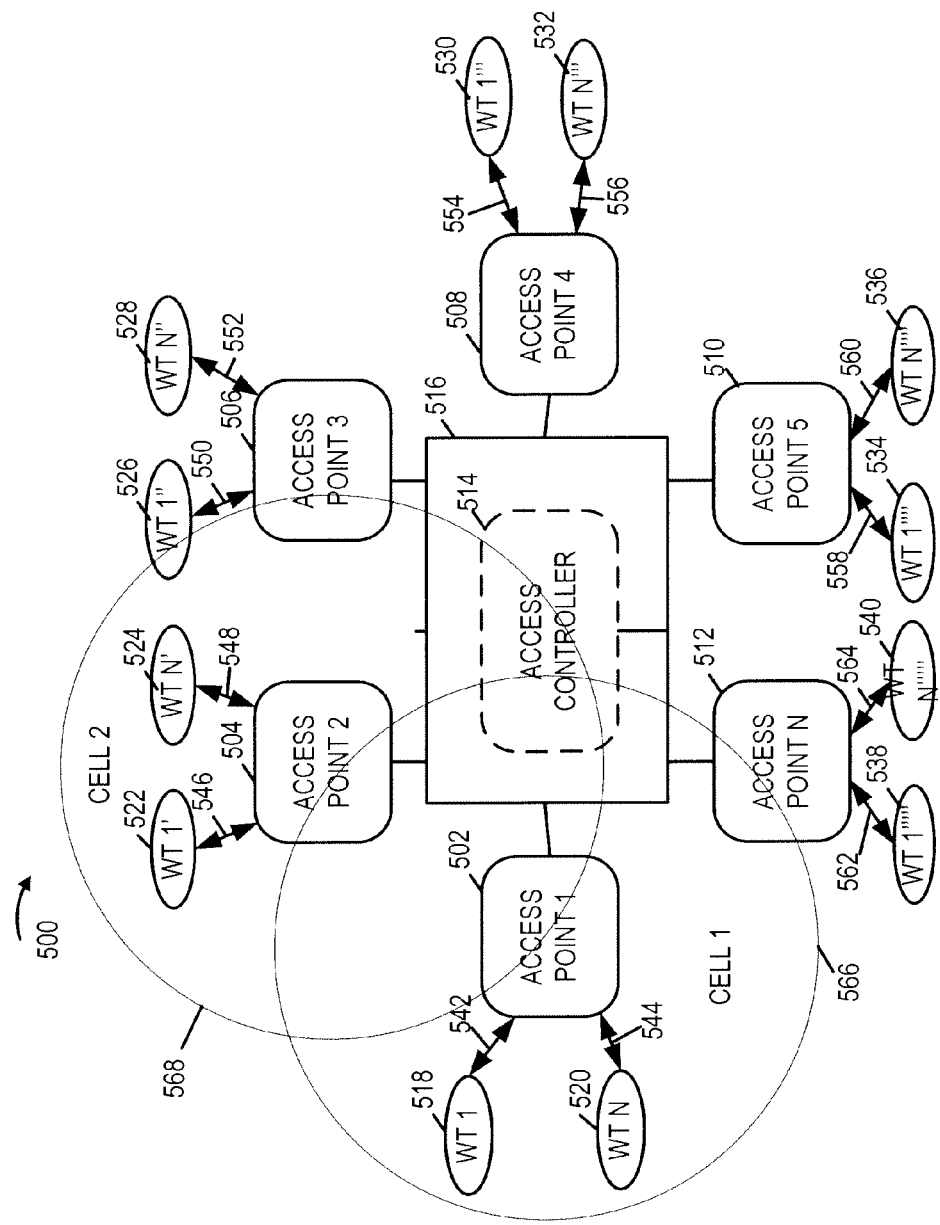
FIG. 5 is a diagram illustrating an example communication system in accordance with one embodiment of the invention.

FIG. 5 is a diagram illustrating an example communication system in accordance with one embodiment of the invention. The example illustrated in FIG. 5 depicts a cellular type of architecture, such as a femtocell or other cellular architecture, that includes a single access controller 514 that can be used to control and communicate with a plurality of access points 502, 504, 506, 508, 510 and 512. In this example, the access points 502, 504, 506, 508, 510, 512 are all wireless access points that communicate with a plurality of wireless terminals such as handsets, for example, or other wireless devices. Accordingly, the access points can each define a communication cell, an example of which can include a femtocell. To avoid excessive clutter in the drawings, only two cells 566, 568 are illustrated. Cell 1 566 illustrates an example coverage area for access point 502 and cell 2 568 illustrates an example coverage area for access point 504. As will be appreciated by one of ordinary skill in the art after reading this description, the other access points will also have corresponding areas of cell coverage.

The access points 502, 504, 506, 508, 510, 512 are communicatively coupled to access controller 514 by way of a backhaul 516. For example, in various embodiments, backhaul 516 can be implemented utilizing a communication network such as a packet-switched network. Likewise, alternative communication schemes or topologies can be implemented for backhaul 516. In some embodiments, access controller 514 is configured to coordinate or control at least some of the operations of at least some of the access points 502, 504, 506, 508, 510, 512. Likewise, access controller 514 can serve as a base station to relay communications among the access points 502, 504, 506, 508, 510, 512 (and ultimately their respective wireless terminals), as well as between the access points 502, 504, 506, 508, 510, 512 and their respective wireless terminals and other entities.

The access points 502, 504, 506, 508, 510, 512 are configured to communicate with wireless devices 518 . . . 540 within their respective cells. Such communications can comprise voice and data communications. Examples of wireless devices can include a cellular phone or other wireless terminal. Accordingly, at least some of the wireless terminals can be mobile devices that may move into and out of communication system 500 as well as within communication system 500. In FIG. 5, wireless terminals 518 . . . 520 are coupled to access point 502 via wireless links 542 . . . 544. Likewise, wireless terminals 522 . . . 524 are coupled to access point 504 via wireless links 546 . . . 548, and so on for the other access points 506, 508, 510, 512 as depicted in this example. In some embodiments, the geographical locations of the access points are known to the controller as well as to the access points.

FIG. 5 generally depicts a cellular architecture in which a plurality of cells or access points are distributed to provide coverage cells to the multiple wireless terminals in the coverage areas. The access points are under control and coordination of the access controller. Accordingly, FIG. 5 can represent a number of different communication architectures such as a femtocell architecture and a macro cell architecture. The various embodiments discussed below are described in terms of the components and topology illustrated in FIG. 5. However, after reading these descriptions, it will be apparent to one of ordinary skill in the art how these embodiments can be implemented with other architectures.

Figure 6:
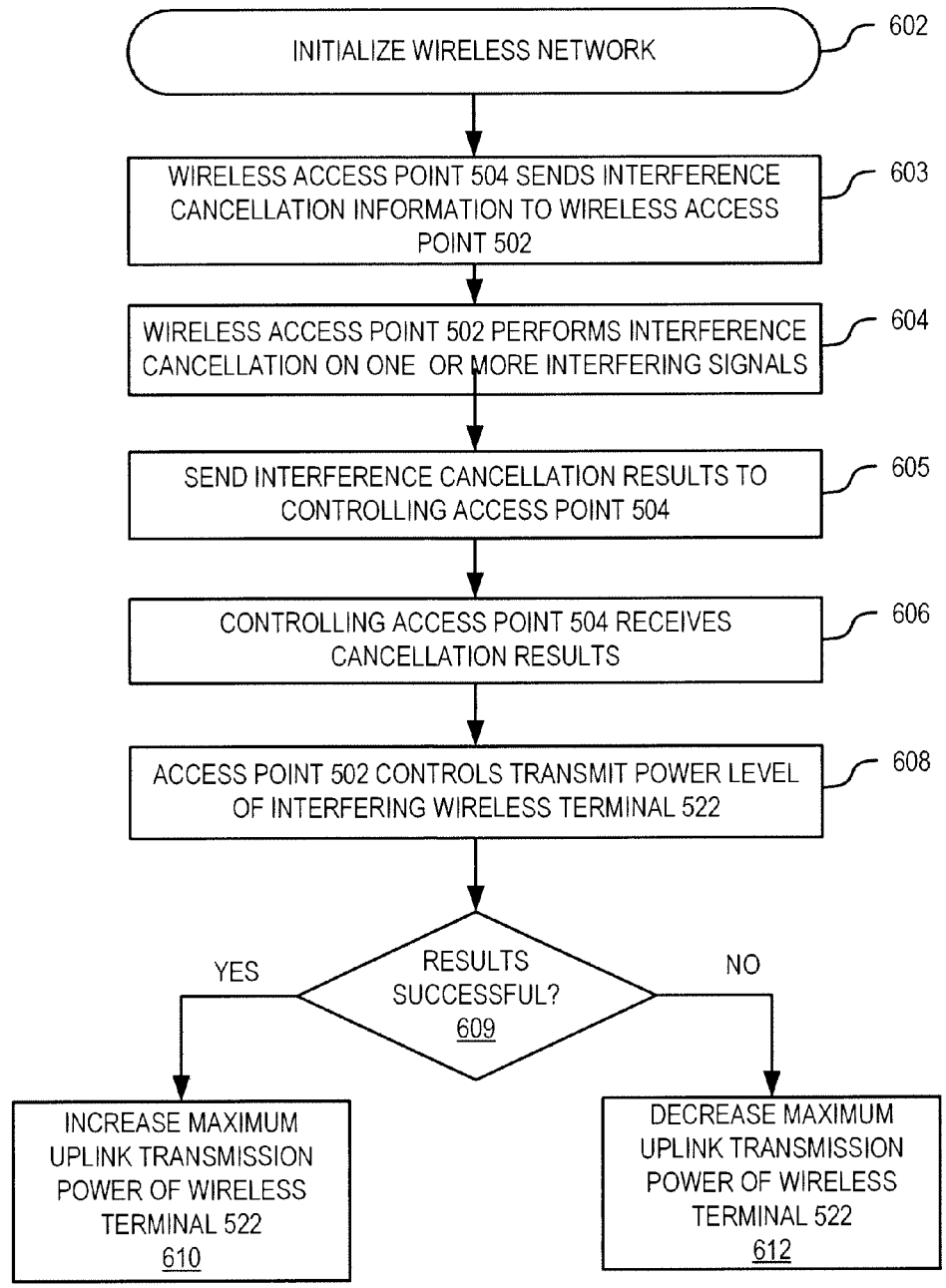
FIG. 6 is a diagram illustrating an example method for operating an access point in a communication system in accordance with one embodiment of the invention.
Figure 7:
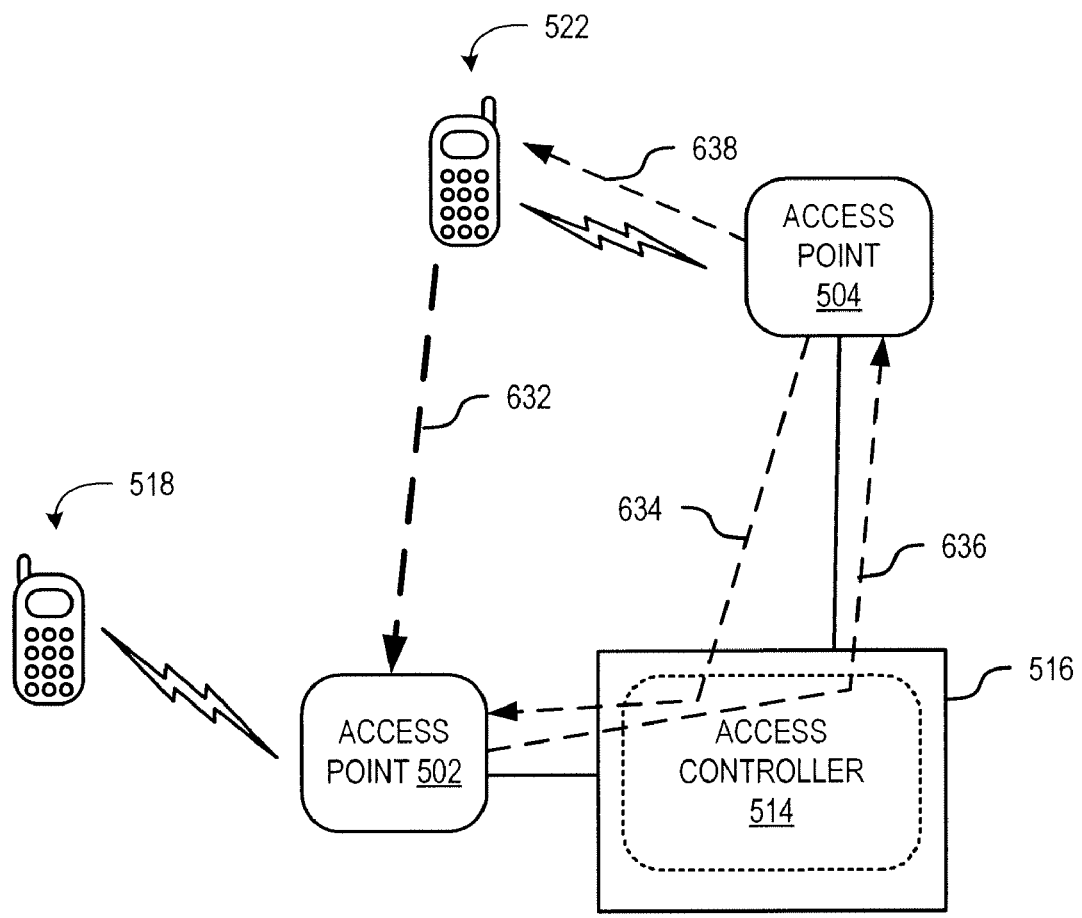
FIG. 7 is a diagram illustrating signaling flow in accordance with an example embodiment corresponding to the process illustrated in FIG. 6.

FIG. 6 is a diagram illustrating an example method for operating an access point in a communication system in accordance with one embodiment of the invention. FIG. 7 is a diagram illustrating signaling flow in accordance with an example embodiment corresponding to the process illustrated in FIG. 6. FIGS. 6 and 7 are described in terms of an example case of interference cancellation where an access point is receiving interference from a wireless terminal registered to a different access point. For example, assume a scenario in communication system 500 (FIG. 5) where wireless terminal 522, which is registered to access point 504, is in proximity to access point 502. Further consider a scenario where access point 502 is experiencing interference 632 from wireless terminal 522 as shown in FIG. 7. Referring now to FIGS. 5, 6 and 7, an example of power control to help mitigate the effects of interference 632 at access point 502 from wireless terminal 522 is now described. At step 602, the network is initialized. For example, in terms of the described scenario access points 502, 504 are powered on and initialized and wireless terminal 522 is connected to access point 504.

At step 603, wireless access point 504 sends interference cancellation information 634 to wireless access point 502. As illustrated in the example of FIG. 7, interference cancellation information 634 is provided to access point 502 by way of access controller 514 and backhaul network 516. The interference cancellation information 634 can include information such, for example, as an identification of the one or more wireless terminals (an example of which is wireless terminal 522) that are registered to communicate with wireless access point 504. In some embodiments, the interference cancellation information 634 can include a scrambling code that corresponds to uplink signals transmitted by wireless terminal 522. Such a scrambling code can be used in some embodiments for transmission of uplink data traffic from wireless terminal 522 to access point 504. In various embodiments, the interference cancellation information 634 includes at least one terminal specific parameter such as, for example, a transmission timing offset or a pseudo-random time-frequency hopping pattern. In some embodiments, the uplink data traffic transmissions are performed in data traffic transmission bursts.

At step 604, wireless access point 502 detects interference from neighboring wireless terminals and performs interference cancellation to mitigate the effects of this interference. In terms of the above-described example, access point 502 detects interference 632 from wireless terminal 522 and performs interference cancellation to mitigate the effects of interference from wireless terminal 522. Access point 502 performs an interference canceling operation on the interference signal 632, measures the success of the interference cancellation operation and communicates that information 636 to access point 504. In various embodiments, interference cancellation operations can be performed utilizing conventional interference cancellation techniques. For example, the interfering signal can be identified, isolated and an anti-phase version created and fed back into the receiver to effectively cancel the interfering signal. Alternatively, characteristics of the interfering signal can be modeled and appropriate processing, such as with a DSP or other processor for example, can be used to cancel the effects of the modeled interfering signal. An example of an access point (such as access point 502 in this example) architecture that is configured to perform an interference cancellation operation, measuring its success, and communicate to another access point is described in further detail below with reference to FIG. 8.

At step 606 access point 504 receives interference cancellation results information 636 indicating the level of success of the interference cancellation at access point 502 of the interference caused by wireless terminal 522 to access point 502. Accordingly, the interference cancellation results information 636 can include an identification of one or more wireless terminals communicating with access point 504 and the success access point 502 is experiencing canceling interference from each of these one or more wireless terminals. The access point 504 can use this information 636 to determine whether interference caused by wireless terminal 522 is actually causing detrimental interference to access point 502.

In the example illustrated in FIG. 7, interference cancellation results information 636 is provided from access point 502 to access point 504 by way of access controller 514 and backhaul network 516. In one embodiment, the communications between access point 502 and access point 504 can be made through backhaul 516 and access controller 514 as illustrated in the example architecture 500 of FIG. 5 and as illustrated in FIG. 7. In other embodiments, an alternative communication path can be established between access point 504 and access point 502 such as, for example, a direct communication link between the two.

At step 608, based on this information 636, access point 504 controls the uplink transmission power level used by wireless terminal 522 as a function of the information received from access point 502 regarding the success of its interference cancellation efforts. This can be accomplished by access point 504 generating and sending an uplink power control signal 638 to wireless terminal 522.

Control of the transmit power of the wireless terminal 522 as performed in step 608 can be accomplished through a number of techniques, and the transmit power of the wireless terminal can be increased or decreased based on the level of success of the interference cancellation. For example, if the received information indicates successful interference cancellation, the uplink transmit power level of wireless terminal 522 can remain the same or potentially be increased. Thus, if interference cancellation operations by access point 502 are sufficient to cancel the interfering signal from wireless terminal 522 to a level that this interfering signal is not detrimental to the operations of access point 502, then the uplink transmit power of wireless terminal 522 can remain the same or increased based on this level of success.

Likewise, if interference cancellation operations performed by access point 502 are not sufficient to cancel the interfering signal from wireless terminal 522 so that it is not detrimental to the operations of access point 502, then the uplink transmit power of wireless terminal 522 can be decreased based on this level of success. Examples of increasing or decreasing the uplink transmit power of wireless terminal 522 based on the success of interference cancellation operations at access point 502 are described with reference to steps 610 and 612.

In step 610, if interference cancellation at access point 502 is successful for wireless terminal 522, access point 504 can increase the maximum permitted to uplink transmission power level of wireless terminal 522. In one embodiment, this adjusts upward the maximum uplink transmission power level that can be used by wireless terminal 522 when transmitting to access point 504. In step 612, if the interference cancellation operation at access point 502 is not able to mitigate the effects of interference from wireless terminal 522 successfully, access point 504 decreases the uplink transmission power level of wireless terminal 522. For example, access point 504 can be configured to decrease the maximum permitted uplink transmission power level of wireless terminal 522 when transmitting to the access point 504.

The operation can be repeated in an iterative or repetitive manner such that power control in response to the success of interference cancellation can be performed on a continuous or periodic basis, on a scheduled basis, or based on event triggers. For example, steps 603, 604, 605, 606 and 608 (including steps 610 and 612 as appropriate) can be performed at predetermined periodic or scheduled intervals as deemed appropriate for a given communication system. As another example, events such as the addition of a new wireless terminal into the network, the exit of a wireless terminal, the increase in the total power level at an access point above a certain threshold, the reconfiguration of a user transmitter, and other events, can trigger the operation. Accordingly, the success of interference cancellation operations can be routinely monitored (continuously, periodically, at scheduled times, or based on event occurrences) and the power level of wireless transmitters controlled in real time or near real time to help improve the performance of the system overall. Of course, the system can establish boundaries above or below which uplink transmit powers of wireless terminals cannot extend regardless of the level of success of interference cancellation operations.

Predetermined thresholds to measure success of interference cancellation can be calculated and established as part of system design criteria based on parameters such as, for example, system power budgets, SIRs, SNRs, SINRs, receiver specifications and so on. The signal-to-interference ratio, or SIR, is the quotient between the average received modulated carrier power (the signal) and the average received co-channel interference power from offending transmitters. The SINR, or signal-to-interference-plus-noise ratio, considers the effect of interfering terminals and the background noise.

For example, where interference with a base station from an interfering or offending terminal is being cancelled such that the effects of that interference are not adversely affecting operations of the base station, there is no need to reduce the power of the offending terminal. Accordingly, the offending terminal can be left unchanged, or its uplink transmit power might even be increased. On the other hand, where the interference cancellation operation is not able to cancel the effects of the interfering signal sufficiently, the operation can lower the uplink transmit power of the offending signal so as to not cause interference to the other base station. In some embodiments, the success of interference cancellation can be determined based on the SIR or SINR at the receiver. If as a result of the interference cancellation the SIR or SINR is above a predetermined threshold, then the interference cancellation is successful.

In another embodiment, the SIR or SINR can be compared before and after interference cancellation of a given signal. If the level of improvement of the SIR or SINR is greater than a predetermined threshold, then the interference cancellation can be deemed successful. Accordingly, for example, even if the overall SIR or SINR is not ideal (for example, due to other sources of interference), the success of the interference cancellation of a single signal from an offending terminal can itself be determinative of whether the uplink power of that offending terminal should be adjusted. As such, in scenarios where interference is caused by multiple wireless terminals, the effects of interference cancellation on interfering signals from individual terminals can be considered and addressed.

An example SINR model was provided above. From an SINR perspective, a desired signal is successfully received from the wireless terminal, i, by the access point, j, if the ratio of received signal strength at the access point and the combined interference from other transmitters along with ambient noise exceeds j's antenna gain. Simply put the SINR can be expressed as ratio of the power of the intended signal and the channel gain to the sum of the interfering signals and the ambient noise. For example, assume that is the transmission power from a desired terminal is $P_i$, gain of the radio channel between the wireless terminal i and its associated access point j is $G_{ij}$ and $\eta_j$ is the thermal noise at receiver. The SINR at receiver due to transmission from node i in the presence of other interfering transmissions from other handsets k is given by:

$$SINR_{ij} = \frac{P_i G_{ij}}{\eta_j + \sum_{k \neq i} P_k G_{kj}}$$

As this illustrates, if the effects of one or more interfering signals $P_k$ are effectively cancelled, the SINR seen by the receiver improves.

Figure 8:
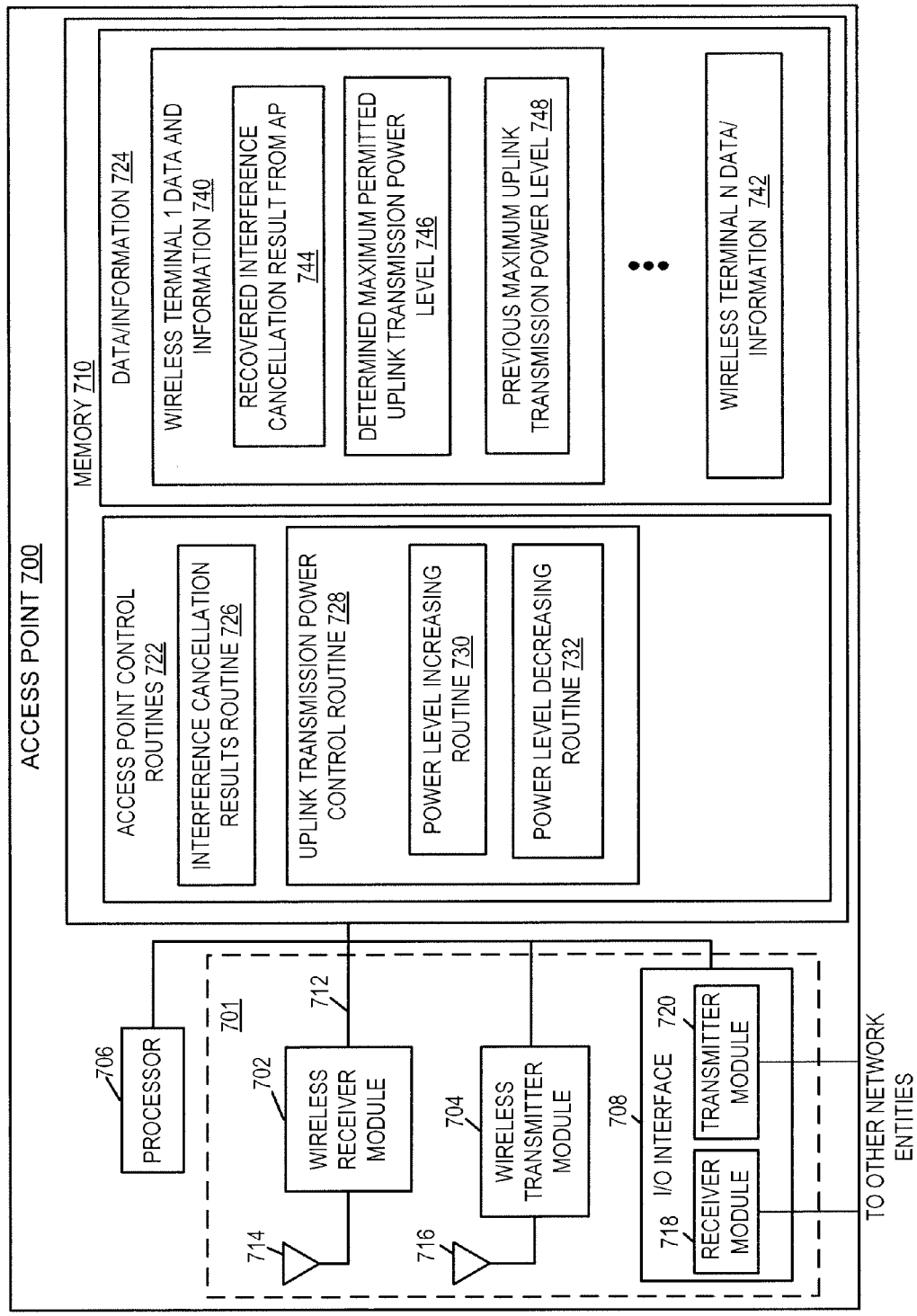
FIG. 8 is a diagram illustrating a block diagram for an example wireless access point or base station in accordance with one embodiment of the invention.

FIG. 8 is a diagram illustrating a block diagram for an example wireless access point or base station in accordance with one embodiment of the invention. In particular, the example architecture illustrated in FIG. 8 shows an embodiment of an access point architecture 700 configured to receive the results of an interference cancellation operation from a neighboring access point and to control the uplink transmission power of one or more of its wireless terminals based on the interference cancellation results. With reference to the example described above in conjunction with FIGS. 6 and 7, architecture 700 is an example architecture that can be implemented to perform the functions described of access point 504.

In this example architecture, access point 700 includes a communication module 701, a processor 706, and memory 710. These components are communicatively coupled via a bus 712 over which these modules may exchange and share information and other data. Communication module 701 includes wireless receiver module 702, a wireless transmitter module 704, and I/O interface 708.

An antenna 716 is coupled to wireless transmitter module 704 and is used by access point 700 to wirelessly transmit downlink radio signals to wireless terminals with which it is connected. These downlink RF signals can include voice and data communications sent to the wireless terminals registered with the access point 700 to allow routine communication operations of the cell. The downlink RF signals can also include uplink power control signals that are sent to registered wireless terminals to allow access point 700 to control the uplink transmit power of the wireless terminals that are communicating with access point 700 as a point of attachment to the cell. One example of an uplink power control signal is signal 638 in FIG. 7. Preferably, access point 700 is configured to direct specific uplink power control signals to individual wireless terminals to allow individualized power control of the various wireless terminals associated with the access point 700. For example, where only one wireless terminal is causing interference to a neighboring access point, the transmit power of that wireless terminal can be individually controlled to mitigate or reduce the level of interference it is causing. Likewise, when that wireless terminal ceases to be a source of interference (such as, for example, when it moves out of range of the neighboring access point), its power level can be individually increased.

Antenna 714 is included and coupled to wireless receiver module 702 to allow second access point 700 to receive signals from various wireless terminals within its reception range. Received signals can include voice and data communications from a wireless terminal in the access point's cell coverage area for routine communication operations. Accordingly, signals such as wireless uplink signals from registered wireless terminals that have a current connection with access point 700 are received. Also, access point 700 typically receives interfering uplink signals generated by wireless terminals that are registered to or using another access point as a point of attachment, and that are within range of access point 700. These signals can present unwanted interference to access point 700.

Although two antennas are illustrated in this and other example architectural drawings contained herein, one of ordinary skill in the art will understand that various antenna and antenna configurations can be provided as can different quantities of antennas. For example, transmit and receive functions can be accommodated using a common antenna or antenna structure, or separate antennas or antenna structures can be provided for transmit and receive functions as illustrated. In addition, antenna arrays or other groups of multiple antennas or antenna elements, including combinations of passive and active elements, can be used for the transmit and receive functions.

I/O interface module 708 is provided in the illustrated example, and can be configured to couple access point 700 to other network nodes. These can include nodes or equipment such as, for example, other access points, and an access controller. In this example architecture, the I/O interface module 708 includes a receiver module 718 and a transmitter module 720. Communications via the I/O interface module can be wired or wireless communications, and the transmitter and receiver contained therein include line drivers, receivers radios, antennas or other items, as may be appropriate or the given communication interfaces.

Transmitter module 720 is configured to transmit signals that can include voice, data and other communications to the access controller. Transmitter module 720 can also be configured to send signals conveying interference cancellation information used in an interference cancellation operation at an access controller or other access points. Examples of information that can be shared interference cancellation operations include information such as that described above with reference to FIGS. 6 and 7.

Receiver module 718 is configured to receive signals from other equipment such as, for example, other access points (in some embodiments, via the access controller), and an access controller. These signals can include voice, data and other communications from the access controller or other equipment. Receiver module 718 can also be configured to receive signals including signals indicating a level of success of interference cancellation at a first access point regarding interference to the first access point caused by transmission from a first wireless terminal.

Memory 710 in the illustrated example is configured to store data and other information 724 as well as operational instructions such as access point control routines 722. The processor 706, which can be implemented as a CPU for example, is configured to execute instructions or routines 722 and to use the data and information 724 in memory 710 in conjunction with the instructions to control the operation of the access point 700. For example, access point control routines 722 can include instructions to enable processor 706 to perform operations of power control as described herein, including power control based on interference cancellation such as that described in FIGS. 6 and 7 above.

In the illustrated example, access point control routines 722 include three types of routines. These are an interference cancellation routine 726 and an uplink transmission power control routine. Not illustrated are other routines and modules that can be included to control other operations of access point 700, including routine communication and routing routines and control routines for data and voice traffic among access point 700 and its associated wireless terminals. Although the control routines are illustrated in this example 700 as being implemented utilizing software routines executed by a processor, one of ordinary skill in the art reading this description will appreciate that these functions can also be implemented utilizing hardware or a combination of hardware and software. Likewise although the example access point architecture in this and other figures utilizes a single processor 706, one of ordinary skill in the art reading this description will also appreciate that multi-processor architectures can be utilized.

Interference cancellation routine 726 is configured to recover or determine information that indicates the success of interference cancellation at adjacent or nearby access points. For example, in terms of the process described above with reference to FIG. 6 and, this can include information regarding the success of interference cancellation efforts by access point 502. In one embodiment, interference cancellation routine 726 can be configured to compute the success of interference cancellation efforts by a neighboring access point. Alternatively, the measure or level of success of interference cancellation efforts of a neighboring access point can be computed at that neighboring access point itself, at an access controller, or at another location in the system. This cancellation information can be stored as illustrated at block 744 in data and information storage 740. As the example illustrates, cancellation information can be stored separately for each wireless terminal that is registered to that access point. Accordingly, different wireless terminals can be individually monitored and controlled.

The interference cancellation results 744 from the neighboring access point are used by uplink transmission power control routine 728 to increase or decrease the uplink transmit power levels of an interfering wireless terminal. This can be done, for example, as described above with reference to FIGS. 6 and 7. Accordingly, routines or instructions can be included with uplink transmission power control routine 728 to generate a signal to increase or decrease the uplink transmit power of a wireless terminal communicating with access point 700. This power control signal can be transmitted by wireless and the antenna 716 to the intended wireless terminal (for example, wireless terminal 522 in FIG. 6 or wireless terminal 550 in FIG. 7). Information relating to permitted transmit power of various wireless terminals communicating with access point 700 can be stored in memory 710. For example, determined maximum permitted a link transmission power levels for a given wireless terminal (WT1) is illustrated as being stored at 746. This determined maximum permitted to uplink transmission power level data can be used to generate the signal that is sent to the wireless transmitter to control or bound its uplink transmission power. This maximum permitted to uplink transmission power level data can be used in a subsequent power control operation as a starting point from which to calculate an appropriate increase or decrease in power control based on the results of the interference cancellation.

Interference cancellation routine 726 is described above as determining the success of interference cancellation operations for a given wireless terminal and a given access point. In some embodiments, the access point can be configured to consider the results of interference cancellation operations for a given terminal by multiple access points, and to make power control decisions as a function of multiple measurements. For example, if a given wireless terminal (for example wireless terminal 522 in FIG. 7) is interfering with multiple access points, the results of interference cancellation operations from all or a subset of all of the access points with which is wireless terminal is interfering can be considered. If the results of the interference cancellation operations at multiple access points for a given wireless terminal are similar, determination as to the action taken can be straightforward. For example, if interference cancellation of the interfering signal from the wireless terminal is successful at all of the access points, then the controlling access point can either instruct the wireless terminal to increase its uplink transmit power or it can leave the wireless terminal transmitting at its current power level. Likewise, if interference cancellation of the interfering signal from the wireless terminal is not successful at all the access points then the controlling access point can instruct the wireless terminal to decrease its uplink transmit power level. If the results of interference cancellation at multiple access points have different degrees of success, more complex decision-making algorithms can be utilized. For example, in one embodiment the system can be configured to respond to the lowest-common denominator—that is, the system can be configured to decrease the uplink transmit power of the offending wireless terminal if the results of interference cancellation at any of the access points are unsuccessful.

In another embodiment, the system can be configured to increase or decrease the uplink transmit power of the offending wireless terminal based on whether interference cancellation is successful or unsuccessful, respectively, at a majority of the polled access points. In yet another embodiment, neighboring access points can be weighted and the determination as to power control operations in response to interference cancellation can be made based on a weighted combination of the measures of success from the various access points. In a conventional architecture such as a conventional femtocell architecture, for example, each of the access points might be given equal weight (in other words, waiting is not used in making the decision). However, in this and other architectures, special class or lower priority access points might be designated based on projected network operations.

Additionally, in further embodiments, characteristics of the wireless terminal and its operations within the network may be used to make determinations as to its uplink transmit power. For example, movement of a wireless terminal through an environment in which the network is installed can be considered as a factor in determining our control operations. For example, built-in GPS functionality, triangulation among access points, or other position-determination techniques can be used to determine the location of the wireless terminal within a network and to track its movement. This movement can be used to determine the appropriate measure of power control in conjunction with the interference cancellation. For example, if a wireless terminal is moving away from an access point with which it is interfering, the system might determine to wait until the wireless terminal has moved farther from the access point before making a determination as to whether its power should be reduced. Likewise, if the system determines that a handoff is about to occur such that the offending wireless terminal is about to be handed off to the access point with which it is interfering, our control operations can be postponed until the handle is complete.

These various decision-making algorithms can be implemented using hardware, software or combination thereof in the access points. Alternatively, these algorithms can be implemented at the access controller level, or shared between the access controller in the access points.

The data and other information 724 illustrated as being included in memory 710 in this example architecture includes information corresponding to a plurality of wireless terminals WT1 740 through WTN 742. The data and for a given wireless terminal in the illustrated example includes interference cancellation data from neighboring access points 744, determined maximum permitted to uplink transmission power levels 746 for the given wireless terminal, and previous maximum uplink transmission power level 748 for the given wireless terminal.

Figure 9:
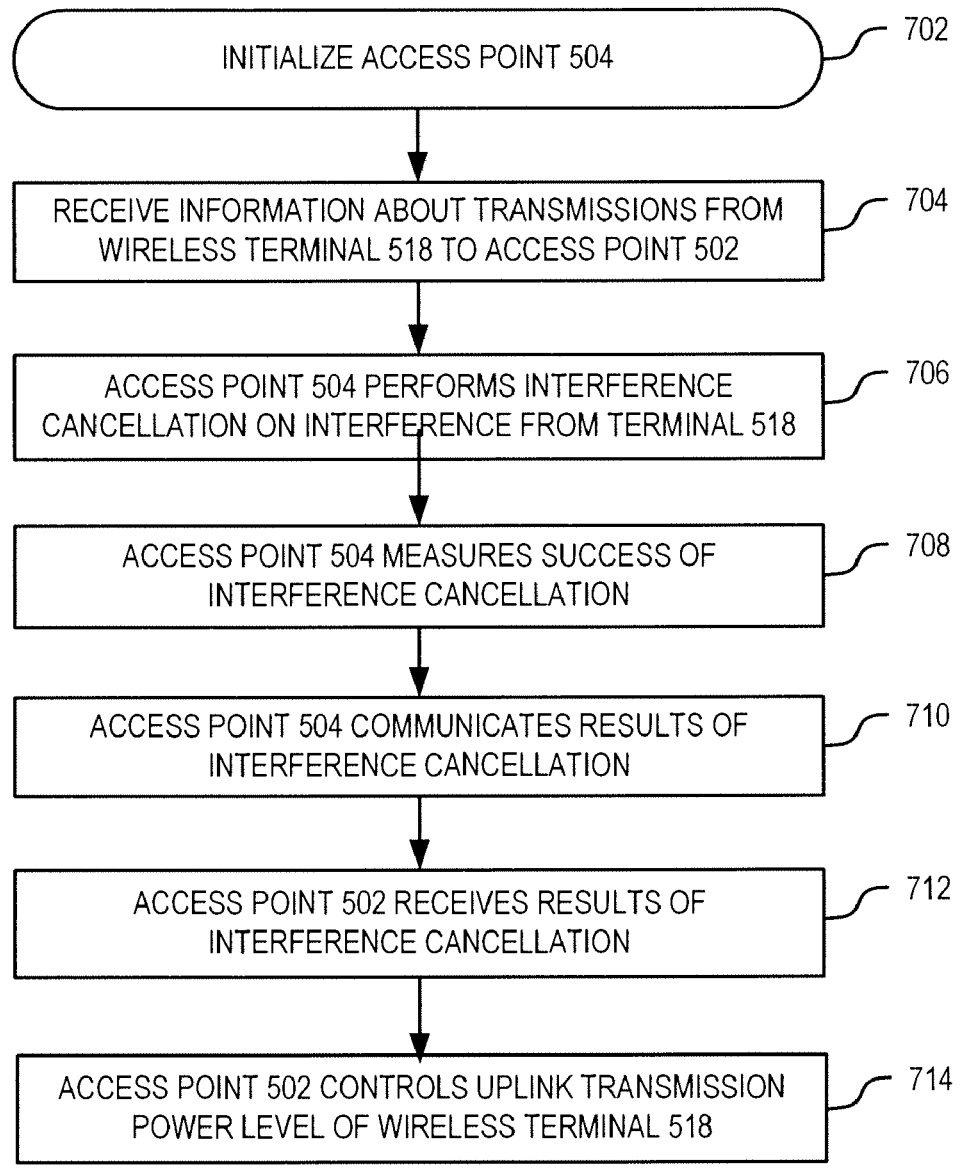
FIG. 9 is a diagram illustrating another process for controlling the uplink power of a wireless terminal based on the success of interference cancellation in accordance with one embodiment of the invention.
Figure 10:
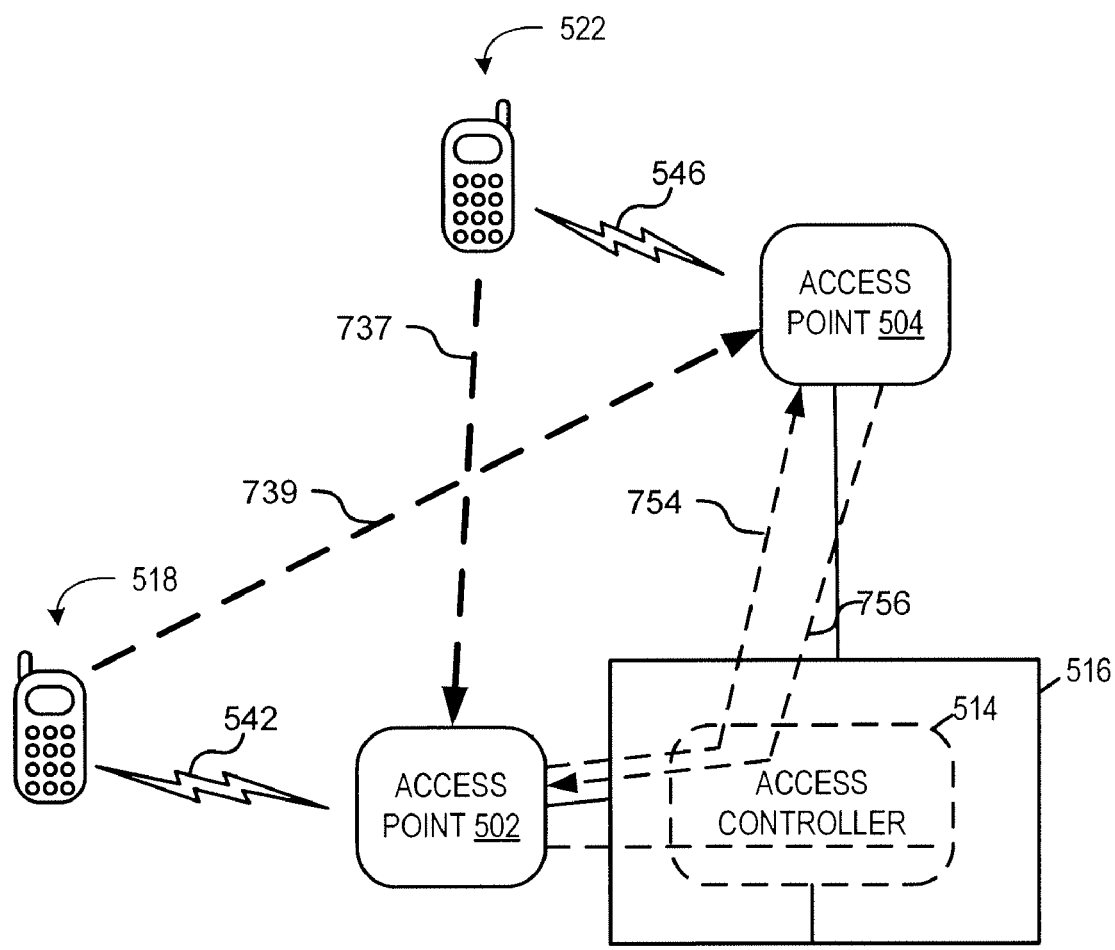
FIG. 10 is a diagram illustrating signaling flow in accordance with an example embodiment corresponding to the process illustrated in FIG. 9.

FIG. 9 is a diagram illustrating another process for controlling the uplink power of a wireless terminal based on the success of interference cancellation in accordance with one embodiment of the invention. FIG. 10 is a diagram illustrating signaling flow in accordance with an example embodiment corresponding to the process illustrated in FIG. 9. FIGS. 9 and 10 are described in terms of an example case of interference cancellation where an access point is receiving interference from a wireless terminal registered to a different access point. For example, assume a scenario in communication system 500 (FIG. 5) where wireless terminal 518, which is registered to access point 502, is in proximity to access point 504. Further consider a scenario where access point 504 is experiencing interference 739 from wireless terminal 518. Referring now to FIGS. 5, 9 and 10, an example of power control to help mitigate the effects of interference 739 from wireless terminal 518 is now described.

In a step 702 access point 504 is powered on and initialized. In a step 704, access point 504 receives information 754 about transmissions from wireless terminal 518 to its associated access point 506. For example, in various embodiments, this information 754 can include information identifying wireless terminal 518 and its communications. Information 754 can also include scrambling code information used for transmissions from wireless terminal 518 to access point 506. In some embodiments, the received information 754 includes at least one of a transmission timing offset and a pseudo-random, time-frequency hopping pattern.

At step 706, access point 504 performs an interference cancellation operation on the interfering signal 739 that it receives from wireless terminal 518. As described above with reference to FIG. 6, this interference cancellation operation can include a conventional interference cancellation operation known to those of ordinary skill in the art. At step 708, access point 504 determines the level of success of the interference cancellation operation, and it communicates the level of success 756 at step 710. For example, information indicating the level of success of the interference cancellation operation can be communicated to wireless access point 502 via access controller 514 and backhaul 516.

At step 712, access point 502 receives the interference cancellation information 756 indicating the level of success of interference cancellation on the interference generated by wireless terminal 518. Access point 502 then, at step 714, can make an adjustment to the uplink transmit power from wireless terminal 518 based on the success of interference cancellation operations on the uplink signal of wireless terminal 518. For example, the uplink power signal of wireless terminal 518 can be adjusted in a manner similar to that described above at step 608 with respect to wireless terminal 522.

As shown, wireless terminal 522 may also be interfering with access point 502 as shown by interference signal 737. Accordingly a similar process as described above can be performed to mitigate the effects of interference by wireless terminal 522. As between access points 502 and 504, the signal flow described above would be effectively 'reversed' wherein access point 502 would perform the interference cancellation and report the results to access point 504, and access point 504 would control the power of wireless terminal 522.

Figure 11:
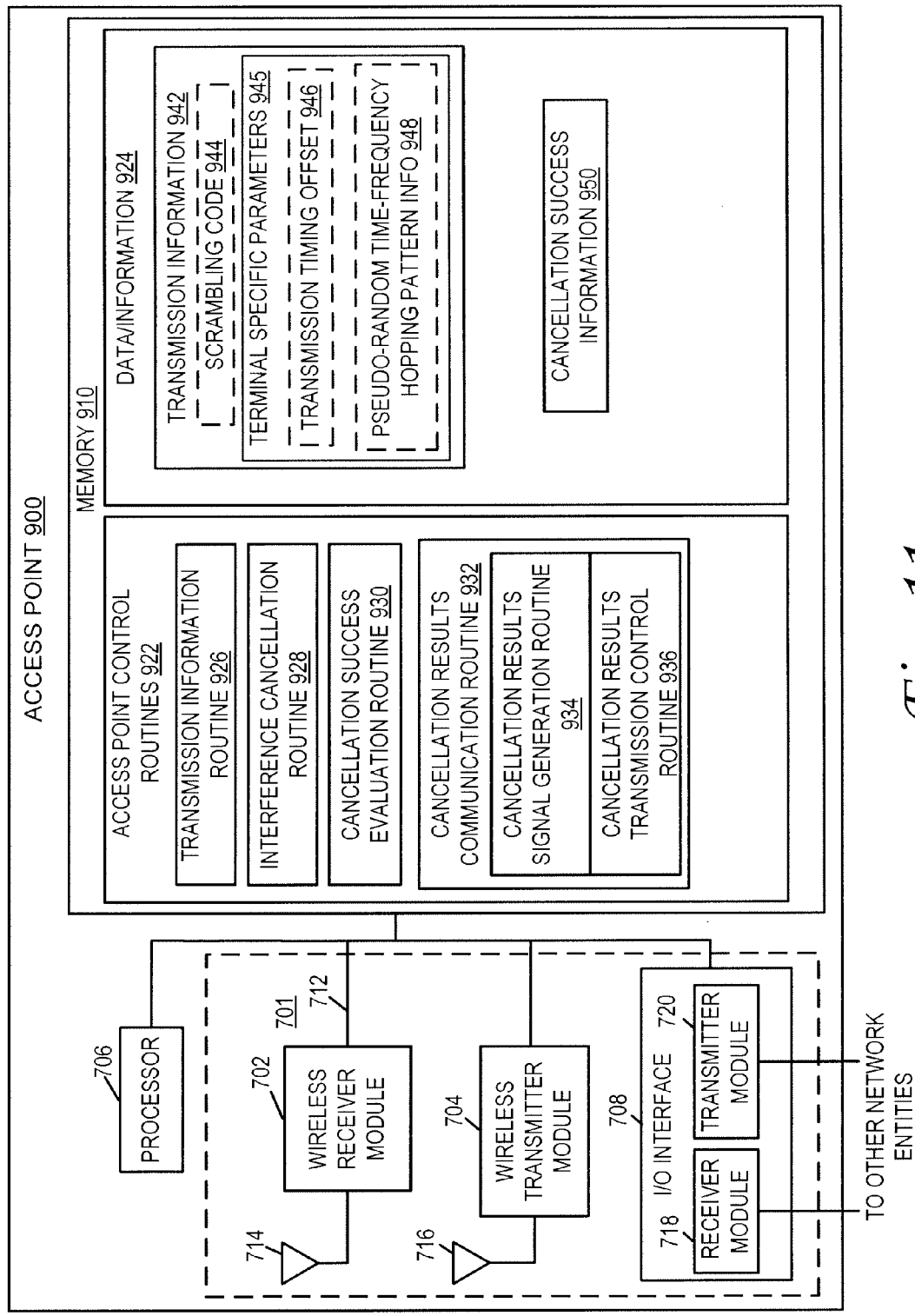
FIG. 11 is a diagram illustrating a block diagram for an example wireless access point or base station in accordance with one embodiment of the invention.

FIG. 11 is a diagram illustrating a block diagram for an example wireless access point or base station in accordance with one embodiment of the invention. Like the example shown in FIG. 8, this example architecture for access point 900 also includes a communication module 701, a processor 706, and memory 710, communicatively coupled via a bus 712 over which these modules may exchange and share information and other data. Communication module 701 includes wireless receiver module 702, a wireless transmitter module 704, and I/O interface 708. Communication module 701 and processor 706, in this example, are implemented as depicted and described with reference to FIG. 8 above. In this example, memory 910, like the example of FIG. 8, stores information and other data as well as routines that can be executed by one or more processors, such as processor 706, to perform functions of the access point. This example describes access point control routines 922 and data and information 942 that can be used by an access point to perform interference cancellation and to communicate with other access points regarding interference cancellation.

Access point control routines 922 illustrated in this example include a transmission information determination routine 926, interference cancellation routine 928, cancellation success evaluation routine 930, cancellation results communication routine 932, results recovery routine 938, and uplink transmission power control routine 940. Transmission information determination routine 926 can be used to cause the access point 900 to receive and store information from another access point regarding its communications from wireless terminals. The received information can be stored in memory 924 and is illustrated in this example as transmission information 942. This information can include information about an interfering or potentially interfering wireless terminal such as, for example, that wireless terminal's scrambling code 944, and other terminal specific parameters 951 such as transmission timing offset 946, and pseudo-random time-frequency hopping pattern information 948.

Interference cancellation routine 928 uses this information to cause Access point 900 to attempt to perform an interference cancellation operation on interfering signals. The success of interference cancellation operations is determined by cancellation success evaluation routine 930. Interference cancellation routine 928 stores this information in memory 924 as cancellation success information 950. As noted above, success can be measured based on SIR or SINK for example.

Cancellation results communication routine 932 causes Access point 900 to send interference cancellation results to another network entity such as an access controller or another access point. For example, the results of interference cancellation operations on a signal from a given interfering wireless terminal can be sent to that wireless terminal's access point for power control as described above with reference to FIGS. 9 and 10. Cancellation results communication routine 932 in this example includes a routine 934 to generate a cancellation results signal and a routine 936 to cause access point 900 to transmit the cancellation results signal.

Figure 12:
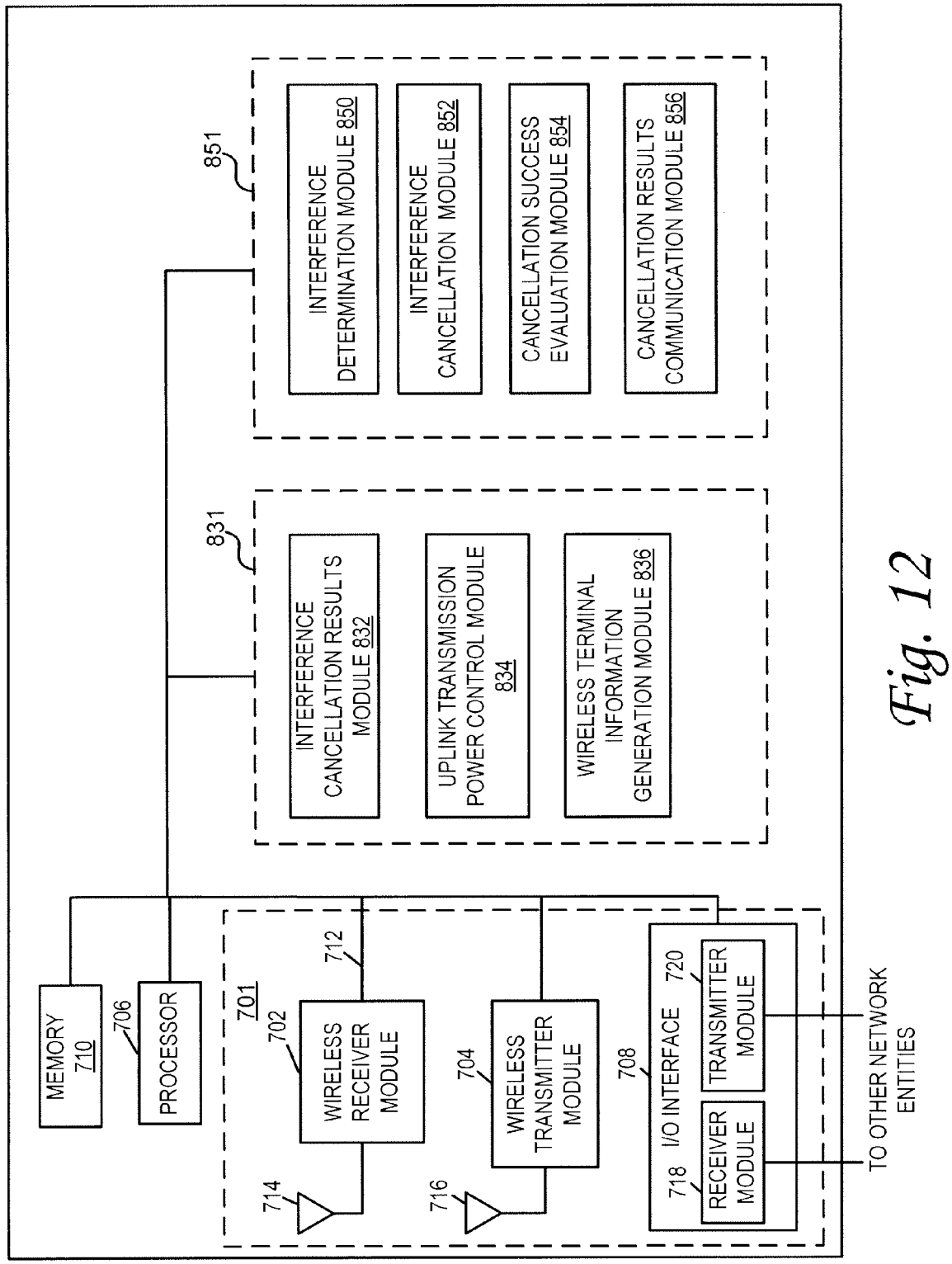
FIG. 12 is a diagram illustrating a sample architecture for a wireless access point with these features combined.

The sample architectures for access points described above with reference to FIGS. 8 and 11, describe an architecture for features of an access point that is controlling a wireless terminal that is interfering with another access point (FIG. 8) and an architecture for features of an access point that is performing interference cancellation (FIG. 11). FIG. 12 is a diagram illustrating a sample architecture for a wireless access point with these features combined. Preferably, to allow a full-featured network, the access points would have the combined feature set such as the example illustrated in FIG. 12. Referring now to FIG. 12, this example architecture includes a communication module 701, a processor 706, memory 710 and a plurality of modules. Communication module 701 and processor 706 can be implemented as described above with reference to FIGS. 8 and 11. Memory 710 is included to store program instructions for routines to be executed by processor 706 to perform desired functions of the access point as well as information and other data used by processor and carrying out these functions.

The modules illustrated in the example of FIG. 12 include power control modules 831 and interference cancellation modules 851. As described in further detail below, various modules can be implemented utilizing hardware, software or a combination thereof. Power control modules 831 include interference cancellation results modules 832, uplink transmission power control module 834, and wireless terminal information generation module 836. As an example, power control modules 831 can be implemented to perform the functions described above with reference to the access point 504 in FIGS. 6, 7, 9 and 10. Interference cancellation modules 851 include an interference determination module 850, an interference cancellation module 852, a cancellation success evaluation module 854, and a cancellation results application module 856. As an example, interference cancellation module 851 can be implemented to perform the functions described above with reference to access point 502 at FIGS. 6, 7, 9 and 10.

Interference cancellation results module 832 is configured to determine the results of interference cancellation at one or more access points in the network. Uplink power control module 834 uses the results of the interference cancellation determined by interference cancellation results module 832 to control the uplink power of an offending wireless terminal. Wireless terminal information generation module 836 generates information about a given wireless terminal and provides this information to other access points.

Interference determination module 850 is used by the access point to determine the amount of interference being generated by a given wireless terminal. Interference cancellation module 852 applies the appropriate interference cancellation to the interfering signal in an attempt to mitigate the impact of the interfering signal. As stated above, various conventional means for interference cancellation of an interfering signal can be utilized. Cancellation success module 854 determines success of the interference cancellation, which is reported by cancellation results application module 856. This information can be reported to other network entities (for example via I/O interface 708) such as access controller, other access points, or other network entities.

Embodiments described above with respect to FIGS. 6 through 12 relate to various apparatus and methods to determine and apply appropriate levels of power control to wireless terminals based on the success of interference cancellation operations at various access points or base stations. In alternative embodiments, signal measurement and power control can be used to mitigate interference within the network through controlled scheduling of network resources. For example, a control node, whether distributed (for example access points or base stations) or centralized (for example an access controller or base station controller) can be configured to schedule resources and control terminals based on network configuration, operation and activity. For example, schedule and control of terminals can be performed based on the knowledge of neighboring access points to avoid interference especially by terminals operating at the cell edge. Likewise, control can be focused on terminals causing higher levels of interference while exercising no control or lesser degree of control on terminals causing little or no interference.

Figure 13:
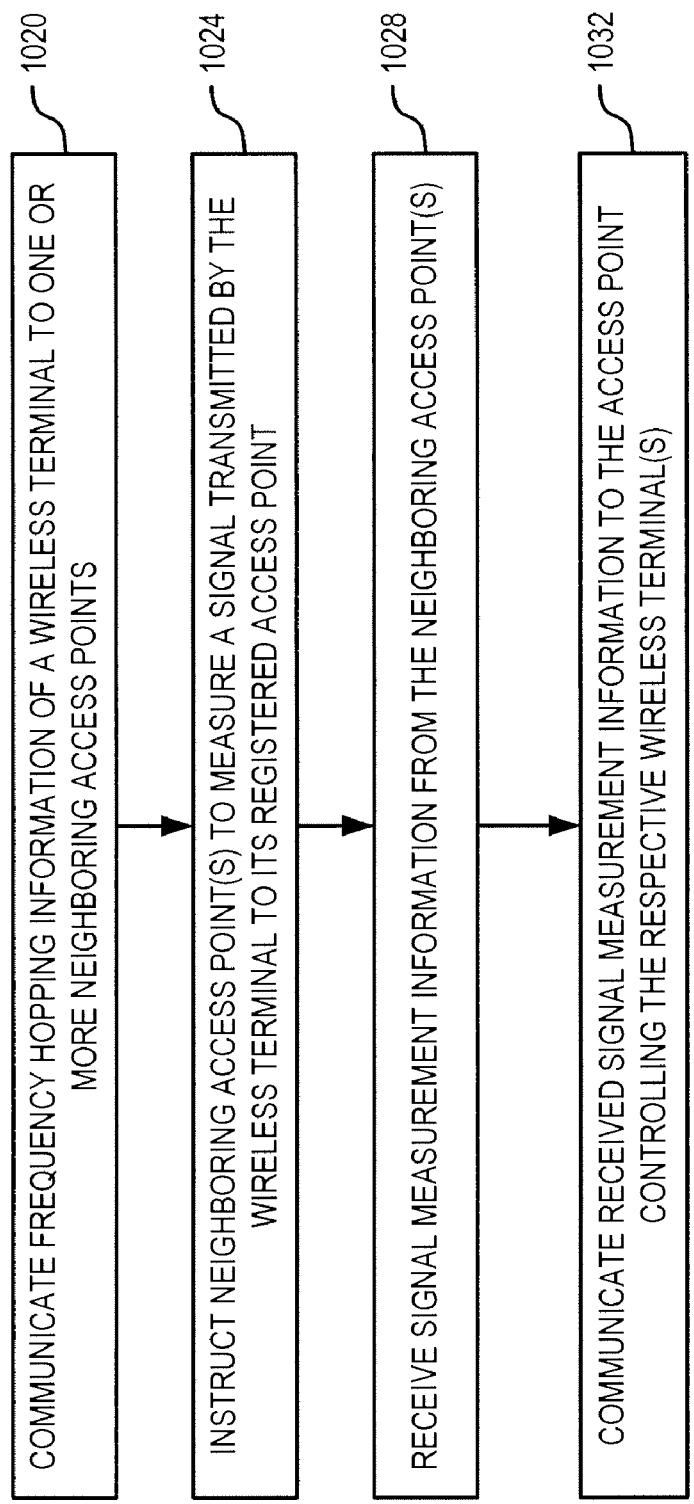
FIG. 13 is a diagram illustrating an example process for a control node instructing the network to perform signal measurements in accordance with one embodiment of the invention.
Figure 14:
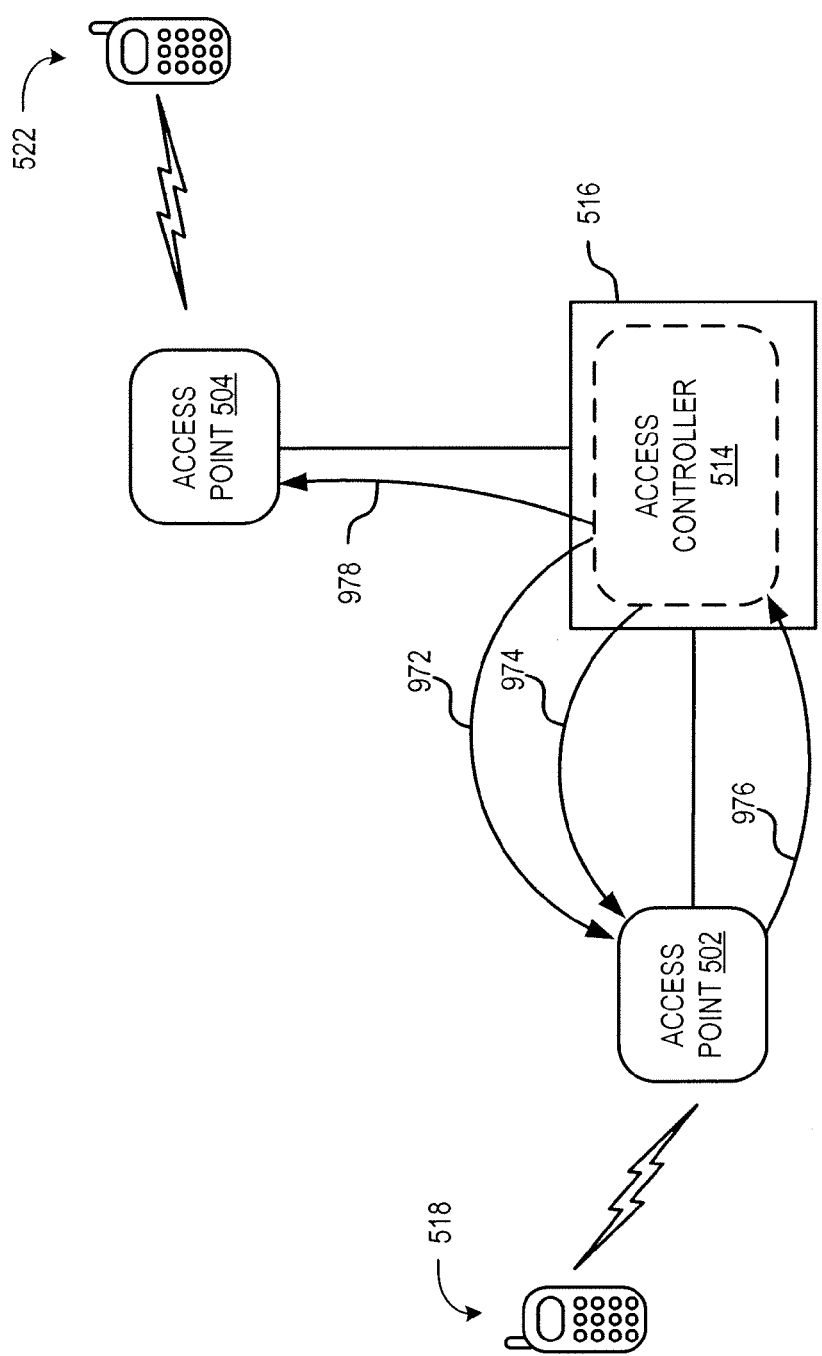
FIG. 14 is a diagram illustrating an example message flow for signal measurements in accordance with one embodiment of the invention.

FIG. 13 is a diagram illustrating an example process for a control node instructing the network to perform signal measurements in accordance with one embodiment of the invention. FIG. 14 is a diagram illustrating an example message flow for signal measurements in accordance with one embodiment of the invention. These figures are described in terms of an example scenario wherein a first access point 502 is communicating with a first wireless terminal 518, and second access point 504 is communicating with a second wireless terminal 522. Although two access points and two wireless terminals (one per access point) are illustrated, it would be apparent to one of ordinary skill in the art after reading this description of these embodiments can be applied to a network having a greater number of access points and wireless terminals. In this example, the control node is implemented within an access controller 514 communicating with access points 502, 504 via a backhaul 516. However, features and functionality of the controller can be distributed amongst access points 502, 504 as well as other access points (not illustrated) in the network.

Referring now to FIGS. 13 and 14, in a step 1020, control node communicates frequency hopping information of wireless terminals to one or more neighboring access points. Neighboring access points can be all access points in the network (other than the subject access point), or access points within communication range of a subject wireless terminal registered to an access point. Accordingly, in this step the control node can communicate frequency hopping information for each of a plurality of wireless terminals registered to their respective access points, to some or all of the other access points in the network. As a result of this step, the various access points in the network obtain frequency-hopping information of the wireless terminals registered to their neighboring access points. The control node can obtain this frequency hopping information from the access points to which the respective wireless terminals are registered. In terms of the example described in FIG. 14, access controller 514 sends frequency hopping information 972 to first access point 502. This is the frequency hopping information of wireless terminal 522. Likewise, the control node sends frequency hopping information for wireless terminal 518 to access point 504.

In some embodiments, the control node also communicates mapping information about the wireless terminals to the neighboring access points. This mapping information maps physical resources to logical time-frequency resource units that may be assigned by controlling access points. With reference to FIG. 14, the control node communicates the mapping information assigned by access point 502 to access point 504. This can be the mapping information that access point 504 assigned to its wireless terminal 522. In some embodiments, access point 502 includes stored information mapping logical time-frequency resource units to a device identifier used by wireless terminal 522 and access point 504 provides a device identifier to access point 502. In some embodiments, access point 504 provides a device identifier to the first access point 502 via the control node.

In a step 1024, control node instructs the neighboring access points that received the frequency-hopping information to measure one or more wireless signals transmitted by wireless terminals to the respective registered access points. Preferably, a signal of a known waveform is measured, which in one embodiment, is an uplink reference signal such as a pilot signal. In terms of the example illustrated in FIG. 14, the control node transmits a signal 974 to access point 502 instructing access point 502 to measure at least one signal transmitted by wireless terminal 522.

In step 1028, a control node receives the signal measurement information from the access points that made the measurements. This is illustrated in the example flow of FIG. 14 where access point 502 sends measurement information 976 to control node 514. Then, at step 1032, the control node communicates the received measurement information for the various wireless terminals to their respective controlling access points. This is illustrated in the example flow of FIG. 14 wherein the control node (access controller 514 in this example) sends at least some of the signal measurement information 978 about wireless terminal 522 to its respective access point 504.

In various embodiments, access point 502 and access point 504 can be within a broadcast coverage area of each other. In other words, or coverage areas may overlap to some extent. Accordingly, a given access point may be responsible for scheduling at least some uplink transmissions that can cause interference to another access point.

Figure 15:
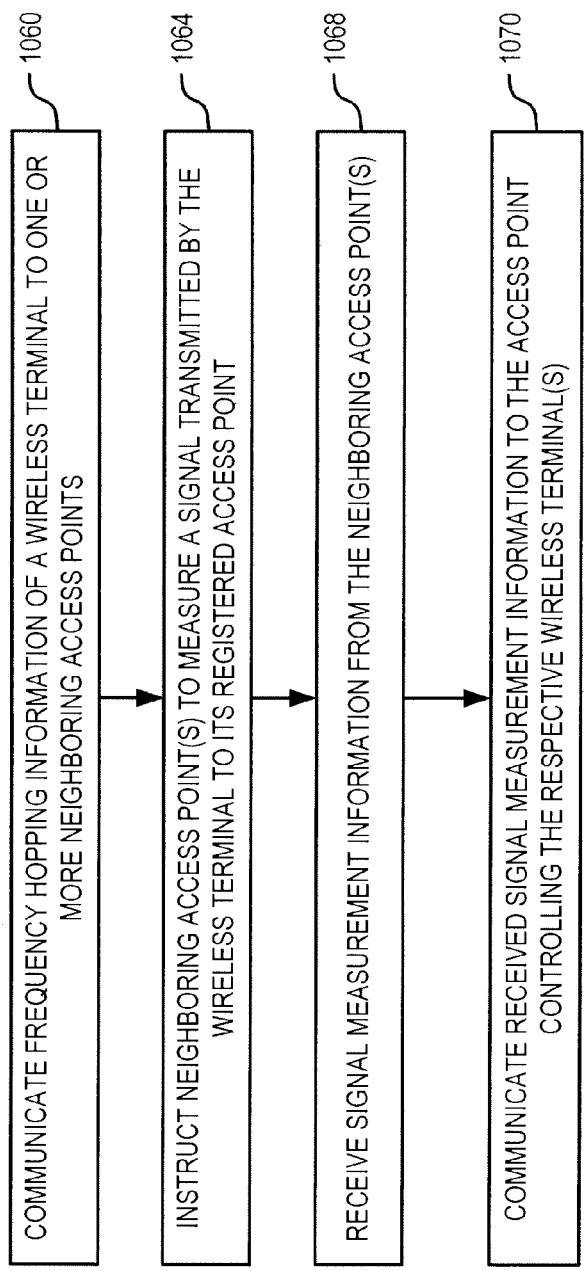
FIGS. 15 and 16 illustrate an extension of the process and flow of FIGS. 14 and 15 in accordance with one embodiment of the invention.
Figure 16:
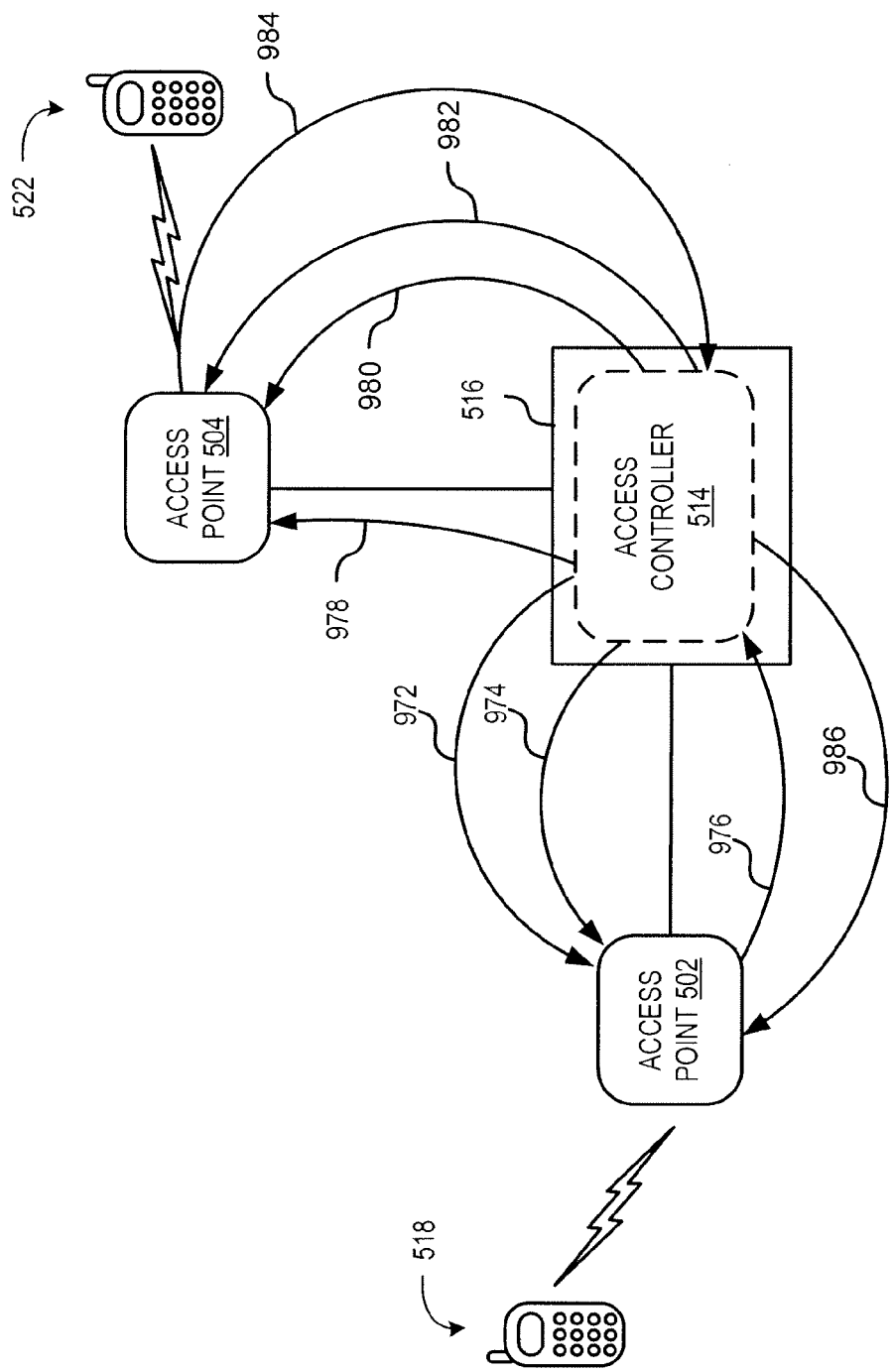

FIGS. 15 and 16 illustrate the remainder of the flow wherein the control node gathers measurement information from access point 504 and shares it with access point 502. Referring now to FIGS. 15 and 16, and continuing the example FIGS. 13 and 14, in a step 1060 frequency hopping information 980 of wireless terminal 518 is communicated to access point 504. This mapping information also maps physical resources to logical time-frequency resource units that may be assigned by controlling access points. With reference to FIG. 16, the control node communicates the mapping information assigned by access point 502 to access point 504. This can be the mapping information that access point 502 assigned to its wireless terminal 518. In some embodiments, access point 504 includes stored information mapping logical time-frequency resource units to a device identifier used by wireless terminal 518, and access point 502 provides a device identifier to access point 504. In some embodiments, access point 502 provides a device identifier to the second access point 504 via the control node.

In a step 1064, the control node transmits a signal 982 to access point 504 instructing access point 504 to measure at least one signal transmitted by wireless terminal 518. Access point 504 makes the measurement and returns the measurement information to the control node as shown by signal 984. In step 1068, the control node receives the signal measurement information from the access points that made the measurements. Then, at step 1070, the control node (access controller 514 in this example) sends at least some of the signal measurement information 986 about wireless terminal 518 to its respective access point 502.

FIGS. 14 and 16 illustrate an example in a simplified network configuration (two base stations and two terminals) whereby signal information of wireless terminals is measured by neighboring access points and this information is shared with the terminals' respective controlling access points. In the illustrated example, this information is gathered and transferred at the direction of the control node, and can also be saved and used by the control node for scheduling and other network operations. In one embodiment, as illustrated, the control node functions are within an access controller. However, in other embodiments, these functions can be distributed among access points or among access points and a controller. In a peer-to-peer network, these functions can be shared among one or more peer devices. A scheduling function, which can also be centralized or distributed as described for the control node functions, can be included in and can be configured to use the signal measurement information to perform network scheduling of wireless communications in a manner so as to mitigate interference from the various operating wireless terminals. Such scheduling can also be performed based on the results of interference cancellation, or a combination of interference cancellation and signal measurement.

For example, where a given wireless terminal is causing interference to a neighboring access point, the terminal's controlling access point can be made aware of this via the mechanisms described above and can control the offending terminal's schedule transmissions in place of or in addition to controlling its power. Wireless terminals and access points can be assigned priorities or grouped into classes have different priorities based on any of a number of criteria. Likewise, a given wireless transmission between wireless terminal and its base station can be prioritized based on the content of that transmission. For example, data transfers might be given a lower priority than real time communications such as audio or video communications. Accordingly, scheduling decisions can be made based on a combination of interference caused by a given wireless terminal or terminals to a given access point or access points.

Figure 17:
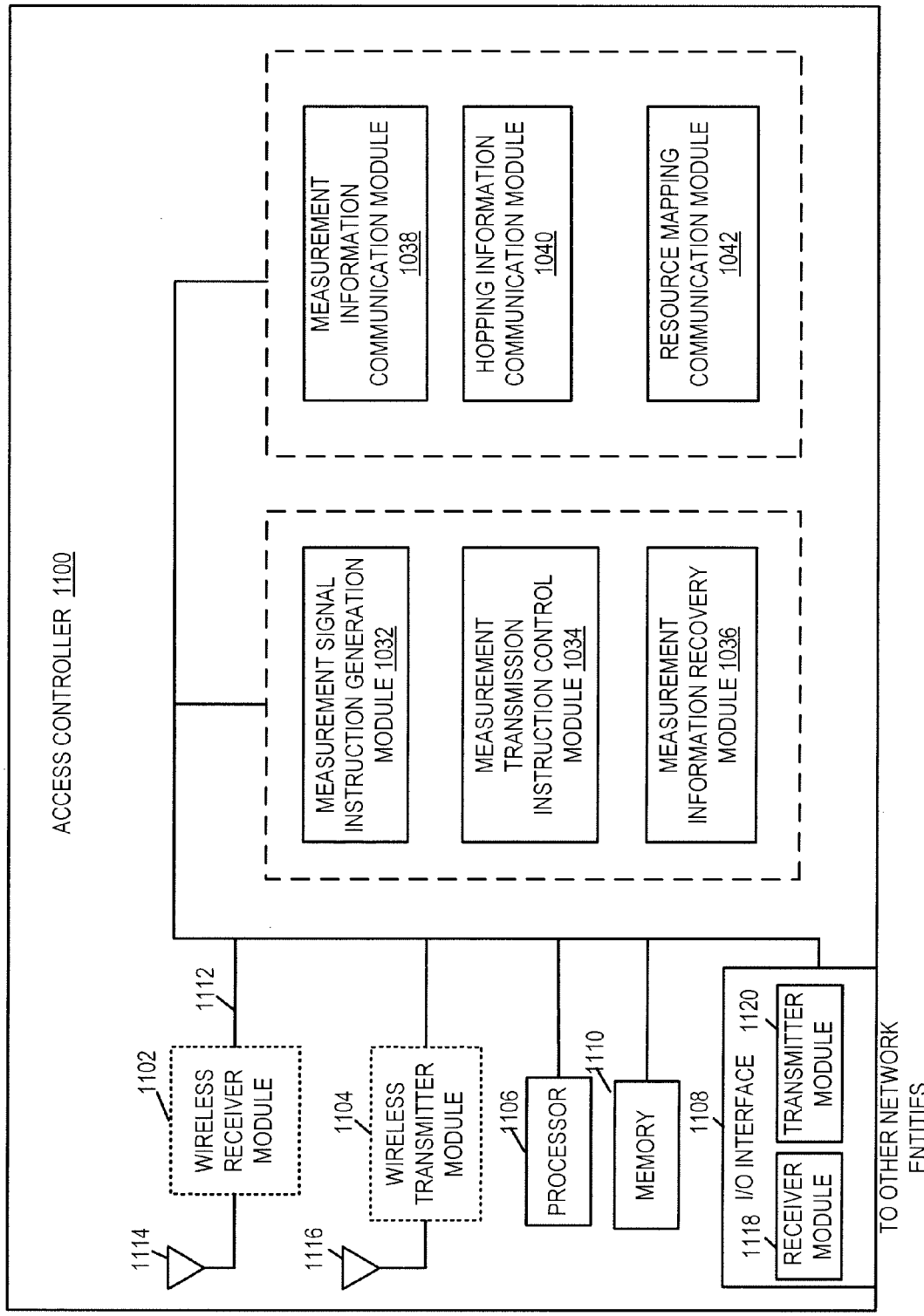
FIG. 17 is a diagram illustrating an example architecture for control node configured to perform the functions described with reference to FIGS. 13-16 in accordance with one embodiment of the invention.
Figure 18:
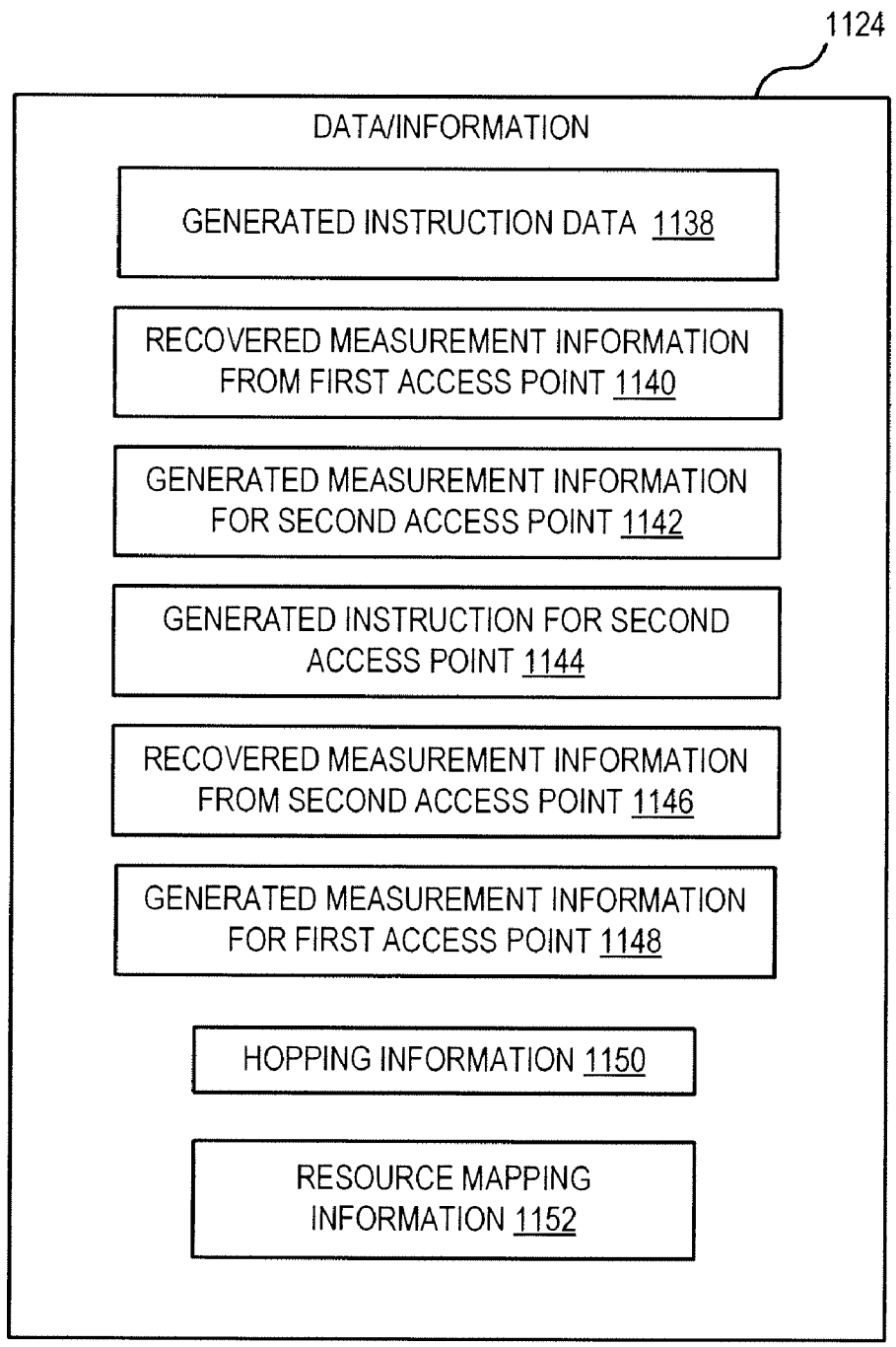
FIG. 18 is a diagram illustrating the data and information that can be stored in memory for these functions.

FIG. 17 is a diagram illustrating an example architecture for control node configured to perform the functions described above with reference to FIGS. 13-16 in accordance with one embodiment of the invention. FIG. 18 is a diagram illustrating the data and information that can be stored in memory for these functions. Referring now to FIGS. 17 and 18, and with continued reference to FIGS. 13-16, the architecture includes a wireless receiver module 1102 with an antenna 1114, a wireless transmitter module 1104 with an antenna 1116, a processor 1106, memory 1110 and an I/O interface 1108 that includes a receiver module 1118 and a transmitter module 1120. Wireless receiver module 1102 and transmitter module 1104 can be used to transfer data and control information slot among the control node 514 and other network entities using a number of wireless communication schemes or protocols. Similarly, I/O interface 1108 used to transfer data and control information among the control node 514 and other network entities. For example, I/O interface 1108 can be Ethernet interface to connect a control node such as an access controller 514 to various access points, to a gateway for connection to the core network, or to other network entities.

The example illustrated in FIG. 17 includes a plurality of modules to perform features and functions described above with reference to FIGS. 13 through 16. In addition to the illustrated modules, the controller 514 can also include other modules configured to perform other control node functions such as, for example, routine base station controller functions such as traffic routing among base stations and the gateway, base station control and other such functions.

In the illustrated example, controller 514 includes a measurement signal construction generation module 1032 that can be used to generate the instruction 1138, 1144 that will be sent to the access points instructing them to measure an uplink signal from one or more wireless terminals. Instructions can include for example instructions described above in signals 974 and 982 in FIGS. 14 and 16. Measurement instruction transmission control module can be used to control transmitters 1104 or 1122 transmit the measurement signal to the intended access point. For example, in terms of a scenario described with reference to FIGS. 13-16, measurement instruction transmission control module 1034 can be configured to cause control node 514 to transmit instructions 974 to access point 502, and instruction 982 to access point 504 via transmitter 1104 or transmitter 1120.

The illustrated example also includes a measurement information recovery module 1036 that can be used to recover measurement information 1140, 1146 from signals received from the access points. For example, in terms of the scenario described above with reference to FIGS. 13-16, measurement information 1140, 1146 can be recovered from signals 976 and 984 received from their respective access points and stored in memory 1124. Measurement information communication module can be used to communicate at least some of the measurement information of a wireless terminal to the controlling access point or that wireless terminal. Accordingly, measurement information indication module can be used for the measurement information 1142, 1148 that is to be transmitted, identify the appropriate recipient access point for the information, control transmitters 1104 or 1122 transmit information. Examples of this are signals 978 and 986 in FIGS. 14 and 16.

Hopping information communication module 1040 can be included to communicate hopping information 1150 of a wireless terminal to the appropriate access points. Examples of this are signals 972 and 980 in FIGS. 14 and 16. Resource application module 1042 can be included to communicate information to the access points mapping physical resources to logical time-frequency resource units that may be assigned by access point to its associated wireless terminals. For example, in the embodiments described above, access point 502 can include stored information 1152 mapping logical time-frequency resource units to a device identifier used by wireless handset 522, and access point 504 provides the device identifier to access point 502. In some of these embodiments, access point 504 provides the device identifier to access point 502 by the control node 1100.

Figure 19:
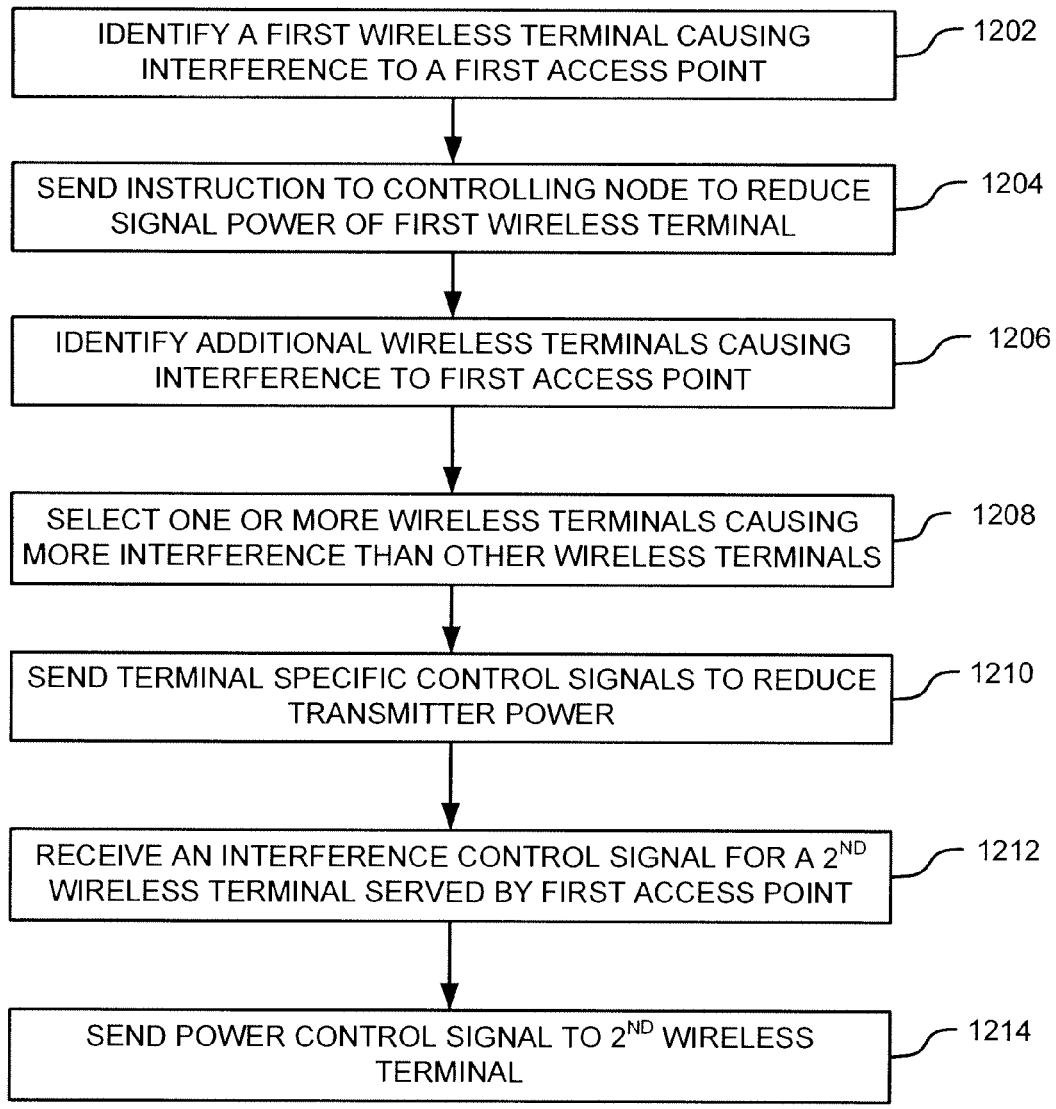
FIG. 19 is an operational flow diagram illustrating an example process for identifying interfering controllers and selectively reducing their power levels in accordance with one embodiment of the invention.
Figure 20:
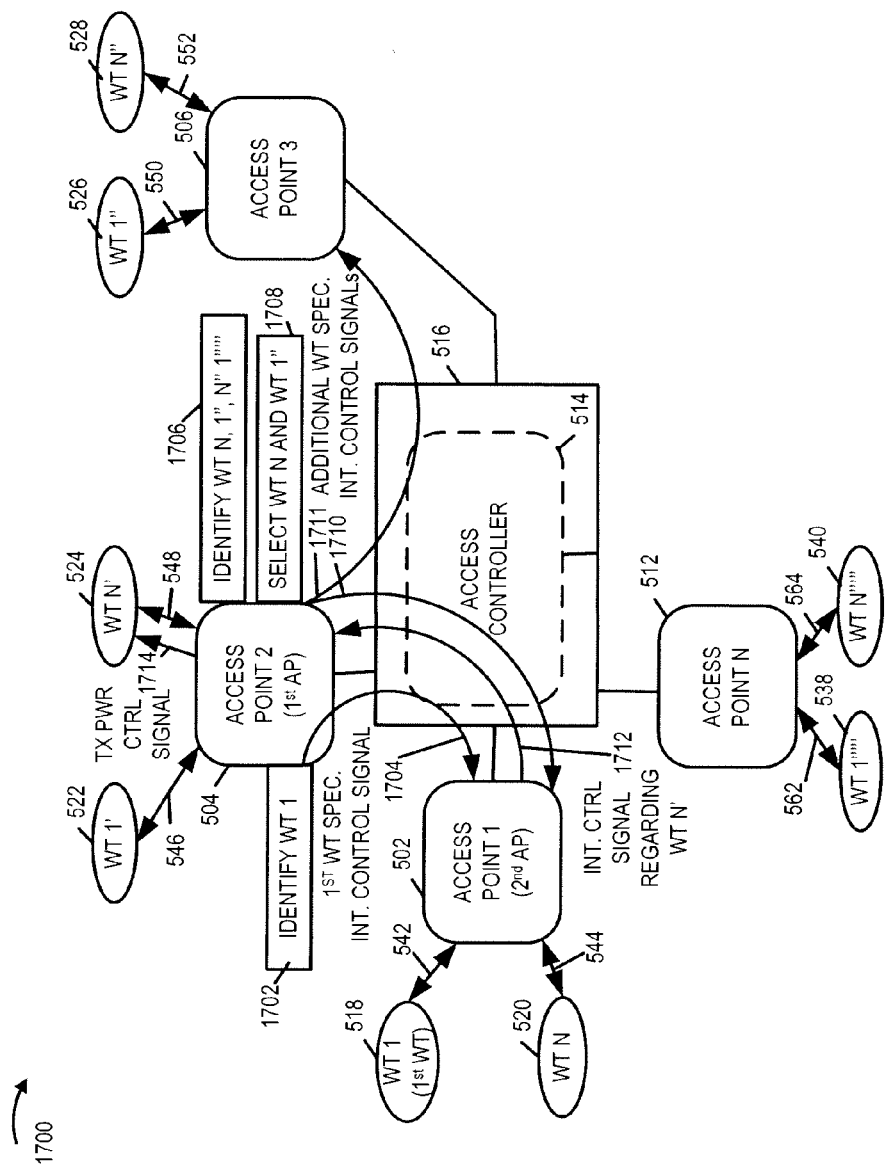
FIG. 20 is a diagram illustrating an example scenario for terminal interference and messaging to facilitate description of FIG. 19.

FIG. 19 is an operational flow diagram illustrating an example process for access points to identify interfering wireless terminals and selectively reduce the power levels through their controlling access points in accordance with one embodiment of the invention. FIG. 20 is a diagram illustrating an example scenario for terminal interference and messaging to facilitate description of FIG. 19. FIGS. 19 and 20 are described in terms of an example scenario in which the wireless terminal 518 registered to access point 502 is causing interference to another access point 504. In the described example scenario, wireless terminals 526, 528, 538 and 520 are also causing interference to access point 504.

Referring now to FIGS. 19 and 20, in a step 1202 an access point identifies a wireless terminal that is causing interference. In terms of the example scenario, access point 502 identifies a first access terminal 518 that is causing interference. In some environments, wireless terminal 518 is only one of a plurality of wireless terminals not served by access point 504, but that cause interference to access point 504. As described above, in the example scenario wireless terminals 520, 546, 528 and 538, which are not served by access point 504, cause interference to access point 504.

In step 502, access point 504 sends instruction to access point 502 to reduce the signal power of wireless terminal 518. In some embodiments, signal from access point 504 to access point 502 specifically identifies this interfering wireless terminal 518. This terminal-specific interference control signal, in some embodiments, is used to cause the access point serving the terminal to control the wireless terminal to reduce its uplink transmission power. This can be a wireless-terminal-specific interference control signal that can be communicated over a backhaul connection between the two access points (access point 504 and access point 502 in this example scenario).

At step 1206, access point 504 identifies additional wireless terminals not served by access point 504 that are causing interference to access point 504. In terms of the example scenario, access point 504 identifies wireless terminals 520, 526, 528 and 538 as causing interference.

At step 1208, access point 504 determines the levels of the interference being caused by these wireless terminals 520, 526, 528, 538 and ranks them to determine their relative levels of interference. Access point 504 can be further configured to select a subset of these wireless terminals causing higher levels of interference than the remainder of the set. For example, access point 504 can choose wireless terminals that are causing a level of interference that is above a determined threshold of interference. For example, assume that access point 504 determines that wireless terminals 520 and 526 are causing higher levels of interference within wireless terminals 528 and 538 and their levels of interference are unacceptable.

At step 1210, access point 504 sends additional wireless-terminal-specific interference control signals to the serving access points are these wireless terminals that are causing unacceptable levels of interference. Accordingly, in the example scenario, access point 504 sends additional wireless-terminal-specific interference control signals to access point 502 and to access point 506 to reduce the uplink transmission power of wireless terminal 520 and wireless terminal 526, respectively.

As this example illustrates, an interference control module can be included with access points to enable the access points to identify interfering wireless terminals serving other access points, determine their levels of interference, identify which of those wireless terminals are causing unacceptable levels of interference, and send wireless-terminal-specific interference control signals to the serving access points of those offending wireless terminals to control their transmitter power. In the above-described example, such an interference control module is provided with or distributed amongst the plurality of access points in the network such that the access points can receive information identifying wireless terminals registered to other access points, measure a level of interference from those wireless terminals, make determinations as to which wireless terminals should be controlled, and generate instructions to the access point controlling those wireless terminals to adjust their transmit power.

The functions of such an interference control module can, in another embodiment, be provided by access controller or shared amongst an access controller and the various access points in the network. For example, an access controller can be configured to receive information from the various access points identifying which wireless terminals are registered to those access points. The access controller can instruct each of the access points to measure levels of interference introduced by wireless terminals registered to the other access points. The access controller can be further configured to evaluate the interference information received from multiple access points, and to make appropriate decisions for power control across the network.

Figure 21:
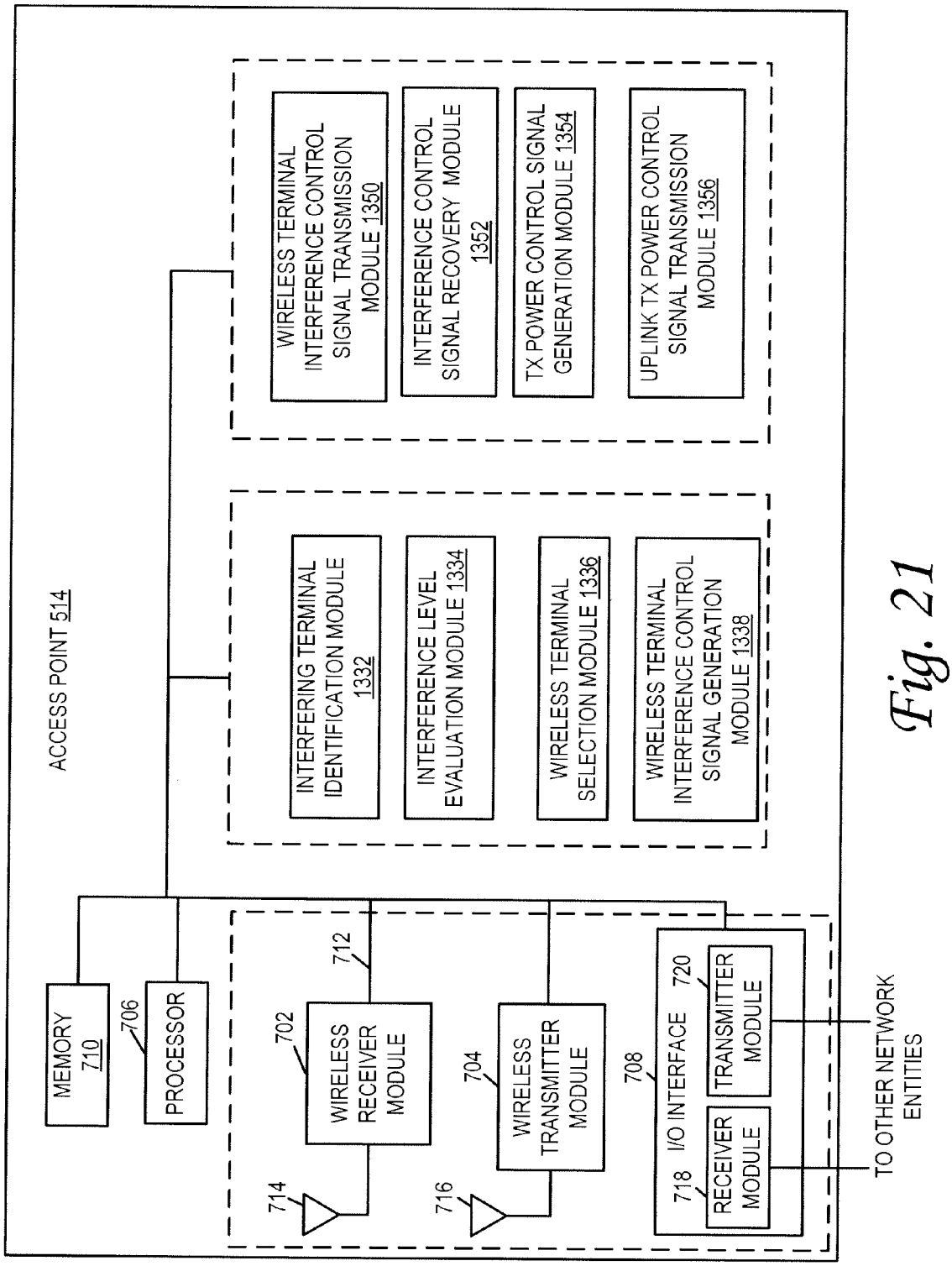
FIG. 21 is a diagram illustrating an example architecture for an access point configured to measure and evaluate interference from wireless terminals in accordance with one embodiment of the invention.
Figure 22:
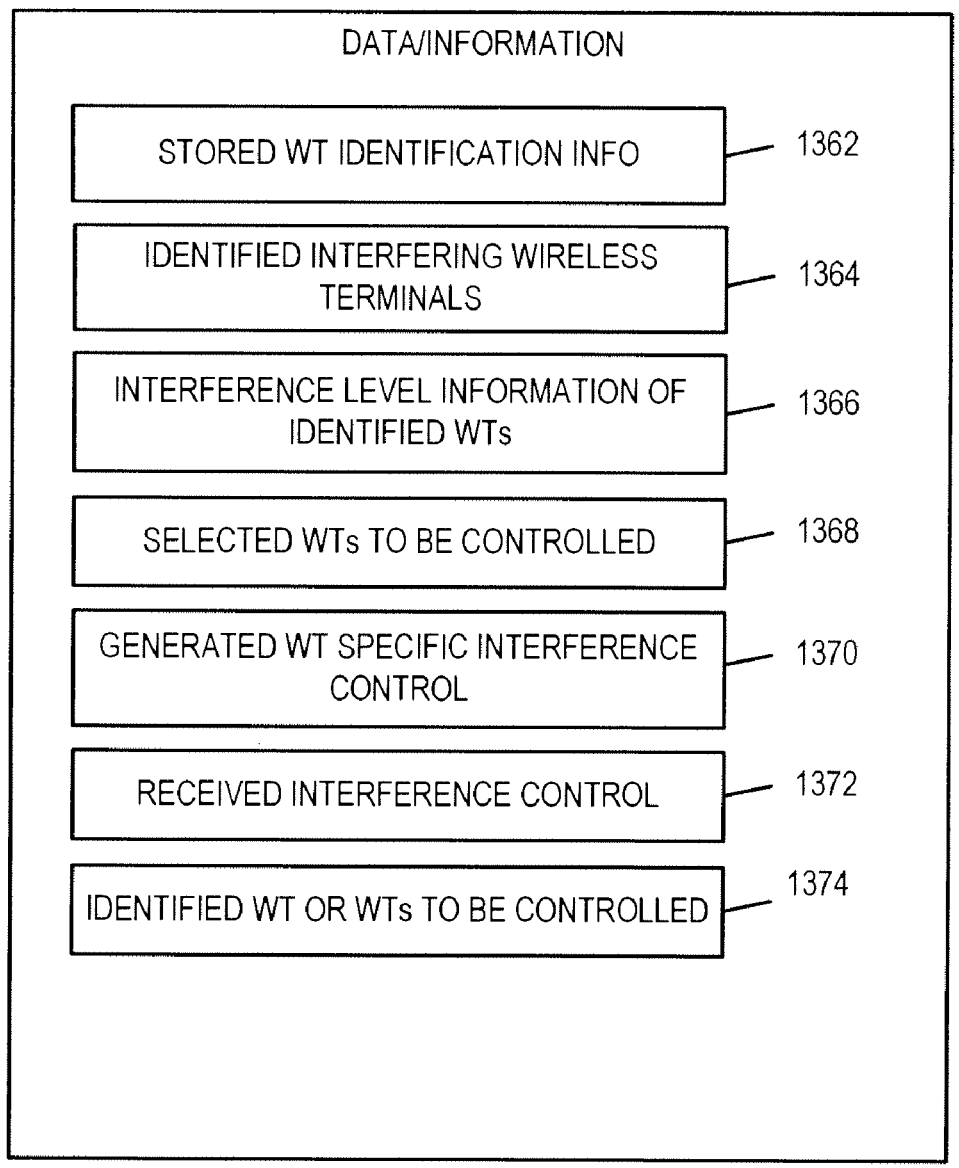
FIG. 22 is a diagram illustrating an example of data and information generated and used by the example architecture of FIG. 20.

FIG. 21 is a diagram illustrating an example architecture for an access point 514 that can be used to perform interference evaluation and power control in accordance with one embodiment of the invention as described above with reference to FIGS. 19 and 20. FIG. 22 is a diagram illustrating data and information can be stored and used by the example access point. Referring now to FIGS. 21 and 22, example architecture includes a communication module 701 such as that illustrated and described above with reference to FIGS. 13 and 11. The example architecture also includes a processor 1306 and memory 1310 which can be implemented such as those, for example, described above with reference to FIG. 12. Although not illustrated, the architecture can further include modules illustrated described above with reference to FIG. 12 in any other modules for operation of other features of an access point in addition to those specifically illustrated described in FIG. 21. In the illustrated example, access point 514 includes interfering terminal identification module 1332, interference level evaluation module 1334, wireless terminal selection module 1336, wireless terminal interference control signal generation module 1338, wireless terminal interference control signal transmission module 1350, interference control signal recovery module 1352, transmit power control signal generation module 1354, and uplink transmit power control signal transmission module 1356.

Interfering terminal identification module 1332 can be used by the access point to identifying wireless terminals registered to other access points that are causing interference. Identification of the identified interfering terminals can be stored as identification information 1364 in system memory. The system memory can also include an identification 1362 of wireless terminals registered to a given access point.

Interference level evaluation module 1334 can be provided to determine the level of interference caused by wireless terminals registered to other access points. Interference level information 1366 can be stored in memory and can be used by wireless terminal selection module 1336 to select or identify wireless terminals that are causing sufficient level of interference to warrant interference mitigation such as, for example, a reduction transmission power. Identification of selected wireless terminals to be controlled 1368 can be stored in memory by wireless terminal selection module 1336.

Wireless terminal interference control signal generation module 1334 uses information on the selected wireless terminals 1368 to generate wireless-terminal-interference control signals that are specific to identifying wireless terminals. Data for these signals 1370 can be stored in memory included in instructions transmitted to access point controlling the offending wireless terminals. A wireless terminal interference control signal transmission module 1350 can be provided to cause the access point to transmit instructions signals to the appropriate access points.

The example architecture also includes an interference control signal recovery module 1352 that receives instructions from other access points instructing the current access point to reduce the transmit power of one or more of its wireless terminals. Data received from other access points can be stored as received interference control data 1372 along with an identification of a wireless terminal or terminals to be controlled 1374. Using this information, and uplink transmit power control signal transmission module 1356 can be used to generate and send the appropriate control signals to the identified wireless terminal or terminals.

As used herein, the term set may refer to any collection of elements, whether finite or infinite. The term subset may refer to any collection of elements, wherein the elements are taken from a parent set; a subset may be the entire parent set. The term proper subset refers to a subset containing fewer elements than the parent set. The term sequence may refer to an ordered set or subset. The terms less than, less than or equal to, greater than, and greater than or equal to, may be used herein to describe the relations between various objects or members of ordered sets or sequences; these terms will be understood to refer to any appropriate ordering relation applicable to the objects being ordered.

Figure 23:
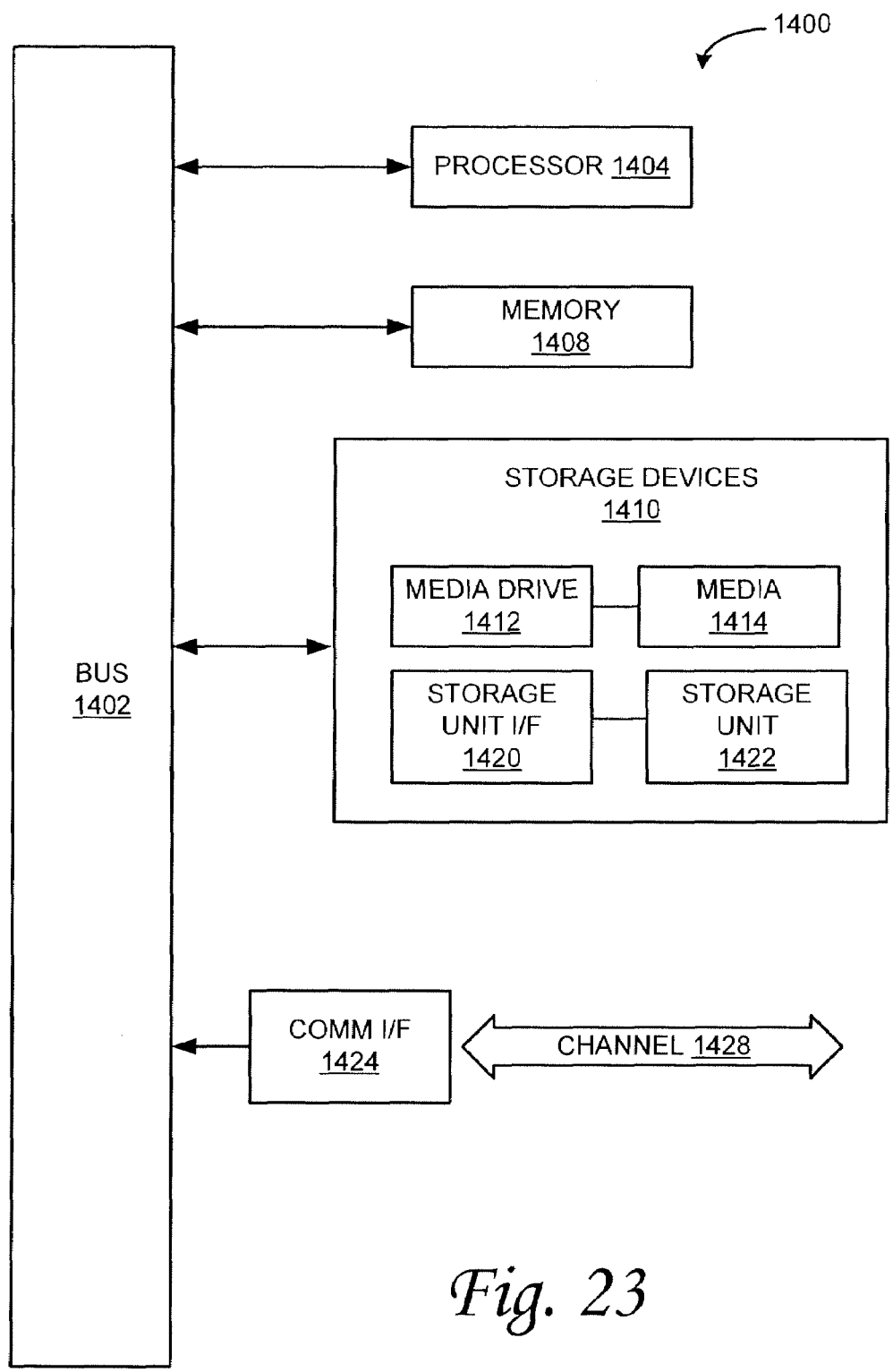
FIG. 23 illustrates an example computing module that may be used in implementing various features of embodiments of the invention.

As used herein, the term module can describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example computing module is shown in FIG. 23. Various embodiments are described in terms of this example—computing module 1400. After reading this description, it will become apparent to a person skilled in the relevant art how to implement the invention using other computing modules or architectures.

Referring now to FIG. 23, computing module 1400 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 1400 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 1400 might include, for example, one or more processors, controllers, control modules, or other processing devices, such as a processor 1404. Processor 1404 might be implemented using a general-purpose or special-purpose processing engine such as, for example, a microprocessor, controller, or other control logic. In the illustrated example, processor 1404 is connected to a bus 1402, although any communication medium can be used to facilitate interaction with other components of computing module 1400 or to communicate externally.

Computing module 1400 might also include one or more memory modules, simply referred to herein as main memory 1408. For example, preferably random access memory (RAM) or other dynamic memory, might be used for storing information and instructions to be executed by processor 1404. Main memory 1408 might also be used for storing temporary variables or other intermediate information during execution of instructions to be executed by processor 1404. Computing module 1400 might likewise include a read only memory ("ROM") or other static storage device coupled to bus 1402 for storing static information and instructions for processor 1404.

The computing module 1400 might also include one or more various forms of information storage mechanism 1410, which might include, for example, a media drive 1412 and a storage unit interface 1420. The media drive 1412 might include a drive or other mechanism to support fixed or removable storage media 1414. For example, a hard disk drive, a floppy disk drive, a magnetic tape drive, an optical disk drive, a CD or DVD drive (R or RW), or other removable or fixed media drive might be provided. Accordingly, storage media 1414 might include, for example, a hard disk, a floppy disk, magnetic tape, cartridge, optical disk, a CD or DVD, or other fixed or removable medium that is read by, written to or accessed by media drive 1412. As these examples illustrate, the storage media 1414 can include a computer usable storage medium having stored therein computer software or data.

In alternative embodiments, information storage mechanism 1410 might include other similar instrumentalities for allowing computer programs or other instructions or data to be loaded into computing module 1400. Such instrumentalities might include, for example, a fixed or removable storage unit 1422 and an interface 1420. Examples of such storage units 1422 and interfaces 1420 can include a program cartridge and cartridge interface, a removable memory (for example, a flash memory or other removable memory module) and memory slot, a PCMCIA slot and card, and other fixed or removable storage units 1422 and interfaces 1420 that allow software and data to be transferred from the storage unit 1422 to computing module 1400.

Computing module 1400 might also include a communications interface 1424. Communications interface 1424 might be used to allow software and data to be transferred between computing module 1400 and external devices. Examples of communications interface 1424 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1424 might typically be carried on signals, which can be electronic, electromagnetic (which includes optical) or other signals capable of being exchanged by a given communications interface 1424. These signals might be provided to communications interface 1424 via a channel 1428. This channel 1428 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 1408, storage unit 1420, media 1414, and channel 1428. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 1400 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for mitigating interference caused to a first access point by a first wireless terminal that is attached to a network via a second access point, the method comprising:
   the first access point identifying an interfering transmission from the first wireless terminal that is causing interference to the first access point;
   the first access point performing an interference cancellation operation on the interfering transmission;
   the first access point determining a level of success of the interference cancellation operation;
   the first access point sending a message to the second access point indicating the level of success of the interference cancellation operation;
   the second access point receiving the message indicating the level of success of the interference cancellation operation performed at the first access point;
   the second access point controlling an uplink transmission power level of the first wireless terminal as a function of information in the message indicating the level of success of interference cancellation performed by the first access point;
prior to the identifying of the interfering transmission, measuring, by the first wireless terminal, downlink pilot signals of the second access point; and
communicating, by the first wireless terminal, information regarding the measurements of the downlink pilot signals of the second access point, wherein the controlling of the uplink transmission power level of the first wireless terminal is based upon the information regarding the measurements of the downlink pilot signals of the second access point.

2. The method of claim 1, wherein the message sent from the first access point to the second access point is sent directly to the second access point, or indirectly via an access point controller.

3. The method of claim 1, wherein the first access point autonomously identifies the interfering transmission from the first wireless terminal that is causing interference to the first access point.

4. The method of claim 1, further comprising the first access point receiving an identification of wireless terminals in the network and using this information to identify the interfering transmission from the first wireless terminal.

5. The method of claim 1, further comprising:
performing, by a central control node, scheduling decisions for the first access point and the second access point to mitigate interference in the network based on information regarding the interfering transmission.

6. The method of claim 1, wherein the controlling of the uplink transmission power level of the first wireless terminal is further based upon one of the following:
determining uplink path loss from the first wireless terminal to the first access point based on uplink receive power of a pilot signal, transmit power headroom of the first wireless terminal, and maximum transmit power of the first wireless terminal, or
information regarding measurements of downlink pilot signals of one or more access points, the downlink pilot signals being measured and communicated by the first wireless terminal 7. The method of claim 1, further comprising:
obtaining location information of the first wireless terminal and tracking movement of the first wireless terminal based on the location information; and
determining an appropriate measure of power control in conjunction with the interference cancellation for the first wireless terminal based on the tracked movement of the first wireless terminal 8. The method of claim 1, further comprising:
assigning priorities to transmissions between the first wireless terminal and the second access point based upon content of the transmissions; and
mitigating interference within the network based upon the priorities assigned to the transmissions.

9. An access point configured to mitigate interference caused by a first wireless terminal that is attached to a network, the access point comprising:
an interference determination module configured to identify an interfering transmission from a first wireless terminal that is causing interference to the access point;
an interference cancellation module configured to perform an interference cancellation operation on the interfering transmission;
a cancellation success evaluation module configured to determine a level of success of the interference cancellation operation;
a first cancellation results communication module configured to send a message to another access point indicating the level of success of the interference cancellation operation, wherein the message is received by a second cancellation results communication module of the another access point, the another access point having an uplink transmission power control module configured to control an uplink transmission power level of the first wireless terminal as a function of information in the received message indicating the level of success of interference cancellation performed by the access point;
a priority assignment module for assigning priorities to transmissions between the first wireless terminal and the second access point based upon content of the transmissions; and
a module for mitigating interference within the network based upon the priorities assigned to the transmissions.

10. The access point of claim 9, further comprising a communication module configured to receive an identification of wireless terminals in the network, and wherein the identification information is used in identifying the interfering transmission from the first wireless terminal that is causing interference to the access point.

11. The access point of claim 9, further comprising a location module configured to, in conjunction with at least the another access point, obtain location information of the first wireless terminal and track movement of the first wireless terminal based on the location information, the another access point determining an appropriate measure of power control in conjunction with the interference cancellation for the first wireless terminal based on the tracked movement of the first wireless terminal 12. A method for mitigating interference caused to a first access point by a first wireless terminal that is attached to a network via a second access point, comprising:
receiving at the second access point information indicating a level of success of interference cancellation performed at the first access point on an interfering signal generated by the first wireless terminal; and
the second access point controlling an uplink transmission power level used by the first wireless terminal as a function of the received information indicating the level of success of interference cancellation performed by the first access point,
wherein when the received information indicating a level of success of interference cancellation indicates that the interference caused by the first wireless terminal is at or below a determined threshold, controlling the uplink transmission power level comprises increasing a maximum permitted uplink transmission power level that can be used by the first wireless terminal when transmitting to the second access point.

13. The method of claim 12, further comprising the second access point sending interference cancellation information to the first access point, the interference cancellation information to be used in an interference cancellation operation at the first access point.

14. The method of claim 13, wherein the interference cancellation information comprises a scrambling code corresponding to uplink signals transmitted by the first wireless terminal 15. The method of claim 14, wherein the scrambling code is used for uplink data traffic transmissions from the first wireless terminal to the second access point.

16. The method of claim 14, wherein the interference cancellation information comprises at least one terminal specific parameter, the at least one terminal specific parameter comprising a transmission timing offset or a pseudo-random time-frequency hopping pattern.

17. The method of claim 12, further comprising determining whether to adjust the transmission power level used by the first wireless terminal based on the level of success of the interference cancellation.

18. The method of claim 17, wherein the step of determining whether to adjust the transmission power level used by the first wireless terminal is performed by the first access point, the second access point or an access controller.

19. The method of claim 12, further comprising:
performing, by a central control node, scheduling decisions for the first access point and the second access point to mitigate interference in the network based on information regarding the interfering signal.

20. The method of claim 12, further comprising:
prior to the identifying of the interfering transmission, measuring, by the first wireless terminal, downlink pilot signals of the second access point; and
communicating, by the first wireless terminal, information regarding the measurements of the downlink pilot signals of the second access point, wherein the controlling of the uplink transmission power level used by the first wireless terminal is based upon the information regarding the measurements of the downlink pilot signals of the second access point.

21. The method of claim 12, wherein the controlling of the uplink transmission power level used by the first wireless terminal is further based upon one of the following:
determining uplink path loss from the first wireless terminal to the first access point based on uplink receive power of a pilot signal, transmit power headroom of the first wireless terminal, and maximum transmit power of the first wireless terminal, or
information regarding measurements of downlink pilot signals of one or more access points, the downlink pilot signals being measured and communicated by the first wireless terminal.

22. The method of claim 12, further comprising:
in conjunction with the first access point, obtaining location information of the first wireless terminal and tracking movement of the first wireless terminal based on the location information; and
determining an appropriate measure of power control in conjunction with the interference cancellation for the first wireless terminal based on the tracked movement of the first wireless terminal.

23. The method of claim 12, further comprising:
assigning priorities to transmissions between the first wireless terminal and the second access point based upon content of the transmissions; and
mitigating interference within the network based upon the priorities assigned to the transmissions.

24. A method for mitigating interference caused to a first access point by a first wireless terminal that is attached to a network via a second access point, comprising:
receiving at the second access point information indicating a level of success of interference cancellation performed at the first access point on an interfering signal generated by the first wireless terminal; and
the second access point controlling an uplink transmission power level used by the first wireless terminal as a function of the received information indicating the level of success of interference cancellation performed by the first access point,
wherein when the received information indicating a level of success of interference cancellation indicates that the interference caused by the first terminal is at or above a determined threshold, controlling the uplink transmission power level comprises decreasing the maximum permitted uplink transmission power that can be used by the first wireless terminal when transmitting to the second access point.

25. Apparatus for mitigating interference caused to a first access point by a first wireless terminal that is attached to a network via a second access point, comprising:
means for receiving from the first access point information indicating a level of success of interference cancellation performed at the first access point on an interfering signal generated by the first wireless terminal; and
means for controlling an uplink transmission power level used by the first wireless terminal as a function of the received information indicating the level of success of interference cancellation performed by the first access point,
wherein when the received information indicating a level of success of interference cancellation indicates that the interference caused by the first wireless terminal is at or below a determined threshold, the means for controlling the uplink transmission power level comprises means for increasing a maximum permitted uplink transmission power level that can be used by the first wireless terminal when transmitting to the second access point.

26. The apparatus of claim 25, further comprising means for sending interference cancellation information to the first access point, the interference cancellation information to be used in an interference cancellation operation at the first access point.

27. The apparatus of claim 25, wherein the interference cancellation information comprises a scrambling code corresponding to uplink signals transmitted by the first wireless terminal.

28. The apparatus of claim 27, wherein the scrambling code is used for uplink data traffic transmissions from the first wireless terminal to the second access point.

29. The apparatus of claim 25, wherein the interference cancellation information includes at least one terminal specific parameter, the at least one terminal specific parameter comprising a transmission timing offset or a pseudo-random time-frequency hopping pattern.

30. The apparatus of claim 25, further comprising determining whether to adjust the transmission power level used by the first wireless terminal based on the level of success of the interference cancellation.

31. The apparatus of claim 30, wherein the step of determining whether to adjust the transmission power level used by the first wireless terminal is performed by the first access point, the second access point or an access controller.

32. The apparatus method of claim 25, further comprising means for, prior to the means for controlling the uplink transmission power level controlling the uplink transmission power level as the function of the received information indicating the level of success of interference cancellation, controlling the uplink transmission power level based upon information regarding measurements of downlink pilot signals of the second access point, the measurements being performed and communicated by the first wireless terminal 33. The apparatus of claim 25, wherein the means for controlling the uplink transmission power level used by the first wireless terminal further base control of the uplink transmission power level upon one of the following:
- determining uplink path loss from the first wireless terminal to the first access point based on uplink receive power of a pilot signal, transmit power headroom of the first wireless terminal, and maximum transmit power of the first wireless terminal; or
- information regarding measurements of downlink pilot signals of one or more access points, the measurements being performed and communicated by the first wireless terminal 34. The apparatus of claim 25, further comprising:
- means for, in conjunction with the first access point, obtaining location information of the first wireless terminal and track movement of the first wireless terminal based on the location information; and
- means for determining an appropriate measure of power control in conjunction with the interference cancellation for the first wireless terminal based on the tracked movement of the first wireless terminal.

35. The apparatus of claim 25, further comprising:
- means for assigning priorities to transmissions between the first wireless terminal and the second access point based upon content of the transmissions; and
- means for mitigating interference within the network based upon the priorities assigned to the transmissions.

36. Apparatus for mitigating interference caused to a first access point by a first wireless terminal that is attached to a network via a second access point, comprising:
- means for receiving from the first access point information indicating a level of success of interference cancellation performed at the first access point on an interfering signal generated by the first wireless terminal; and
- means for controlling an uplink transmission power level used by the first wireless terminal as a function of the received information indicating the level of success of interference cancellation performed by the first access point,
- wherein when the received information indicating a level of success of interference cancellation indicates that the interference caused by the first wireless terminal is at or above a determined threshold, the means for controlling the uplink transmission power level comprises means for decreasing the maximum permitted uplink transmission power that can be used by the first wireless terminal when transmitting to the second access point.

37. Apparatus for mitigating interference caused to a first access point by a first wireless terminal that is attached to a network via a second access point, comprising:
- a receiver module at the said second access point configured to receive information indicating a level of success of interference cancellation performed at the first access point on an interfering signal generated by the first wireless terminal; and
- an uplink transmission power control module at the said second access point configured to control an uplink transmission power level used by the first wireless terminal as a function of the received information indicating the level of success of interference cancellation performed by the first access point,
- wherein the uplink transmission power control module is configured to increase a maximum permitted uplink transmission power level that can be used by the first wireless terminal when transmitting to the second access point when the received information indicating a level of success of interference cancellation indicates that the interference caused by the first wireless terminal is at or below a determined threshold.

38. The apparatus method of claim 37, further comprising a proactive uplink transmission power control module configured to, prior to the uplink transmission power control module controlling the uplink transmission power level used by the first wireless terminal as the function of the received information indicating the level of success of interference cancellation, control the uplink transmission power level used by the first wireless terminal based upon information regarding measurements of downlink pilot signals of the second access point, the measurements being performed and communicated by the first wireless terminal.

39. The apparatus of claim 37, wherein the uplink transmission power control module is configured to further control the uplink transmission power level used by the first wireless terminal based upon one of the following:
- determined uplink path loss from the first wireless terminal to the first access point based on uplink receive power of a pilot signal, transmit power headroom of the first wireless terminal, and maximum transmit power of the first wireless terminal; or
- information regarding measurements of downlink pilot signals of one or more access points, the measurements being performed and communicated by the first wireless terminal 40. The apparatus of claim 37, further comprising a location module configured to, in conjunction with the first access point, obtain location information of the first wireless terminal and track movement of the first wireless terminal based on the location information, the second access point determining an appropriate measure of power control in conjunction with the interference cancellation for the first wireless terminal based on the tracked movement of the first wireless terminal 41. The apparatus of claim 37, further comprising:
- a priority assignment module for assigning priorities to transmissions between the first wireless terminal and the second access point based upon content of the transmissions; and
- a module for mitigating interference within the network based upon the priorities assigned to the transmissions.

42. Apparatus for mitigating interference caused to a first access point by a first wireless terminal that is attached to a network via a second access point, comprising:
- a receiver module at the said second access point configured to receive information indicating a level of success of interference cancellation performed at the first access point on an interfering signal generated by the first wireless terminal; and
- an uplink transmission power control module at the said second access point configured to control an uplink transmission power level used by the first wireless terminal as a function of the received information indicating the level of success of interference cancellation performed by the first access point,
- wherein the uplink transmission power control module is configured to decrease a maximum permitted uplink transmission power level that can be used by the first wireless terminal when transmitting to the second access point when the received information indicating a level of success of interference cancellation indicates that the interference caused by the first wireless terminal is at or above a determined threshold.

43. A non-transitory computer readable medium comprising computer executable instructions stored thereon, which, when executed control a second access point to perform a method of mitigating interference caused to a first access point by a first wireless terminal that is attached to a network via the second access point, the executable instructions comprising instructions to cause the second access point to perform the operation of:

receiving at the second access point information indicating a level of success of interference cancellation performed at the first access point on an interfering signal generated by the first wireless terminal; and the second access point controlling an uplink transmission power level used by the first wireless terminal as a function of the received information indicating the level of success of interference cancellation performed by the first access point, wherein when the received information indicating a level of success of interference cancellation indicates that the interference caused by the first wireless terminal is at or below a determined threshold, the method comprises controlling the uplink transmission power level comprises increasing a maximum permitted uplink transmission power level that can be used by the first wireless terminal when transmitting to the second access point.

44. The non-transitory computer readable medium of claim 43, wherein the method further comprises the second access point sending interference cancellation information to the first access point, the interference cancellation information to be used in an interference cancellation operation at the first access point.

45. The non-transitory computer readable medium of claim 43, wherein the method further comprises determining whether to adjust the transmission power level used by the first wireless terminal based on the level of success of the interference cancellation.

46. The non-transitory computer readable medium of claim 43, wherein the executable instructions comprise instructions to further cause the second access point to perform the operation of:

prior to controlling the uplink transmission power level used by the first wireless terminal as the function of the received information indicating the level of success of interference cancellation, controlling the uplink transmission power level used by the first wireless terminal based upon information regarding measurements of downlink pilot signals of the second access point measured and communicated by the first wireless terminal.

47. The non-transitory computer readable medium of claim 43, wherein the executable instructions comprise instructions to further cause the second access point to perform the operation of:

controlling the uplink transmission power level used by the first wireless terminal based further upon one of the following:

determining uplink path loss from the first wireless terminal to the first access point based on uplink receive power of a pilot signal, transmit power headroom of the first wireless terminal, and maximum transmit power of the first wireless terminal; or information regarding measurements of downlink pilot signals of one or more access points measured and communicated by the first wireless terminal 48. The non-transitory computer readable medium of claim 43, wherein the executable instructions comprise instructions to further cause the second access point to perform the operation of:

in conjunction with the first access point, obtaining location information of the first wireless terminal and tracking movement of the first wireless terminal based on the location information; and determining an appropriate measure of power control in conjunction with the interference cancellation for the first wireless terminal based on the tracked movement of the first wireless terminal.

49. The non-transitory computer readable medium of claim 43, wherein the executable instructions comprise instructions to further cause the second access point to perform the operation of:

assigning priorities to transmissions between the first wireless terminal and the second access point based upon content of the transmissions; and mitigating interference within the network based upon the priorities assigned to the transmissions.

50. A non-transitory computer readable medium comprising computer executable instructions stored thereon, which, when executed control a second access point to perform a method of mitigating interference caused to a first access point by a first wireless terminal that is attached to a network via the second access point, the executable instructions comprising instructions to cause the second access point to perform the operation of:

receiving at the second access point information indicating a level of success of interference cancellation performed at the first access point on an interfering signal generated by the first wireless terminal; and the second access point controlling an uplink transmission power level used by the first wireless terminal as a function of the received information indicating the level of success of interference cancellation performed by the first access point, wherein when the received information indicating a level of success of interference cancellation indicates that the interference caused by the first wireless terminal is at or above a determined threshold, the method comprises controlling the uplink transmission power level comprises decreasing the maximum permitted uplink transmission power that can be used by the first wireless terminal when transmitting to the second access point.

51. A method of operating a second access point which is subject to interference from signals transmitted by a first wireless terminal to a first access point, the method comprising:

receiving information about a transmission from the first wireless terminal to the first access point;

performing an interference cancellation operation on a signal received from the first wireless terminal at the second access point using the received information;

determining a level of success of the interference cancellation operation;

sending information to the first wireless terminal indicating the level of success of the interference cancellation operation, wherein the information indicating the level of success of the interference cancellation operation is sent to the first access point so that it can be used in uplink power control of the first wireless terminal by the first access point; and prior to using the information indicating the level of success of the interference cancellation operation in uplink power control of the first wireless terminal, using information regarding measurements of downlink pilot signals of the first access point in uplink power control of the first wireless terminal, the downlink pilot signals being measured and communicated by the first wireless terminal.

52. The method of claim 51, wherein the information about the transmission from the first wireless terminal to the first access point comprises a scrambling code corresponding to uplink signals transmitted by the first wireless terminal, a transmission timing offset or a pseudo-random time-frequency hopping pattern.

53. The method of claim 51, wherein the controlling of the uplink transmission power level of the first wireless terminal is further based upon one of the following:

determining uplink path loss from the first wireless terminal to the second access point based on uplink receive power of a pilot signal, transmit power headroom of the first wireless terminal, and maximum transmit power of the first wireless terminal; or information regarding measurements of downlink pilot signals of one or more access points in uplink power control of the first wireless terminal, the downlink pilot signals being measured and communicated by the first wireless terminal.

54. The method of claim 51, further comprising:

in conjunction with the first access point, obtaining location information of the first wireless terminal and tracking movement of the first wireless terminal based on the location information; and determining an appropriate measure of power control in conjunction with the interference cancellation for the first wireless terminal based on the tracked movement of the first wireless terminal.

55. The method of claim 51, further comprising:

assigning priorities to transmissions between the first wireless terminal and the first access point based upon content of the transmissions; and mitigating interference within the network based upon the priorities assigned to the transmissions.

56. A second access point which is subject to interference from signals transmitted by a first wireless terminal to a first access point, the second access point comprising:

means for receiving information about a transmission from the first wireless terminal to the first access point;

means for performing an interference cancellation operation on a signal received from the first wireless terminal at the second access point using the received information;

means for determining a level of success of the interference cancellation operation;

means for sending information to the first wireless terminal indicating the level of success of the interference cancellation operation, wherein the information indicating the level of success of the interference cancellation operation is sent to the first access point so that it can be used in uplink power control of the first wireless terminal by the first access point;

means for, in conjunction with the first access point, obtaining location information of the first wireless terminal and tracking movement of the first wireless terminal based on the location information; and means for determining an appropriate measure of power control in conjunction with the interference cancellation for the first wireless terminal based on the tracked movement of the first wireless terminal.

57. The second access point of claim 56, wherein the information about the transmission from the first wireless terminal to the first access point comprises a scrambling code corresponding to uplink signals transmitted by the first wireless terminal, a transmission timing offset or a pseudo-random time-frequency hopping pattern.

58. The second access point of claim 56, further comprising:

means for assigning priorities to transmissions between the first wireless terminal and the first access point based upon content of the transmissions; and means for mitigating interference within the network based upon the priorities assigned to the transmissions.

59. A second access point which is subject to interference from signals transmitted by a first wireless terminal to a first access point, the second access point comprising:

a receiver module configured to receive information about a transmission from the first wireless terminal to the first access point;

an interference cancellation module configured to perform an interference cancellation operation on a signal received from the first wireless terminal at the second access point using the received information;

means for determining a level of success of the interference cancellation operation;

a communication module configured to send information to the first wireless terminal indicating the level of success of the interference cancellation operation, wherein the information indicating the level of success of the interference cancellation operation is sent to the first access point so that it can be used in uplink power control of the first wireless terminal by the first access point; and a location module configured to, in conjunction with the first access point, obtain location information of the first wireless terminal and track movement of the first wireless terminal based on the location information, the second access point determining an appropriate measure of power control in conjunction with the interference cancellation for the first wireless terminal based on the tracked movement of the first wireless terminal 60. The second access point of claim 59, wherein the information about the transmission from the first wireless terminal to the first access point comprises a scrambling code corresponding to uplink signals transmitted by the first wireless terminal, a transmission timing offset or a pseudo-random time-frequency hopping pattern.

61. The second access point of claim 59, further comprising:

a priority assignment module for assigning priorities to transmissions between the first wireless terminal and the first access point based upon content of the transmissions; and a module for mitigating interference within the network based upon the priorities assigned to the transmissions.

62. A non-transitory computer readable medium comprising computer executable instructions stored thereon, which, when executed cause a second access point which is subject to interference from signals transmitted by a first wireless terminal to a first access point, to perform an operation to address the interference, the computer executable instructions comprising:

computer executable instructions configured to receive information about a transmission from the first wireless terminal to the first access point;

computer executable instructions configured to perform an interference cancellation operation on a signal received from the first wireless terminal at the second access point using the received information;

computer executable instructions configured to determine a level of success of the interference cancellation operation;

computer executable instructions configured to send information to the first wireless terminal indicating the level of success of the interference cancellation operation, wherein the information indicating the level of success of the interference cancellation operation is sent to the first access point so that it can be used in uplink power control of the first wireless terminal by the first access point;

computer executable instructions configured to, in conjunction with the first access point, obtain location information of the first wireless terminal and tracking movement of the first wireless terminal based on the location information; and computer executable instructions configured to determine an appropriate measure of power control in conjunction with the interference cancellation for the first wireless terminal based on the tracked movement of the first wireless terminal 63. The non-transitory computer readable medium of claim 62, wherein the information about the transmission from the first wireless terminal to the first access point comprises a scrambling code corresponding to uplink signals transmitted by the first wireless terminal, a transmission timing offset or a pseudo-random time-frequency hopping pattern.

64. The non-transitory computer readable medium of claim 62, wherein the executable instructions further comprise:
  computer executable instructions configured to assign priorities to transmissions between the first wireless terminal and the first access point based upon content of the transmissions; and
  computer executable instructions configured to mitigate interference within the network based upon the priorities assigned to the transmissions.

* * * * *